Figure 1:
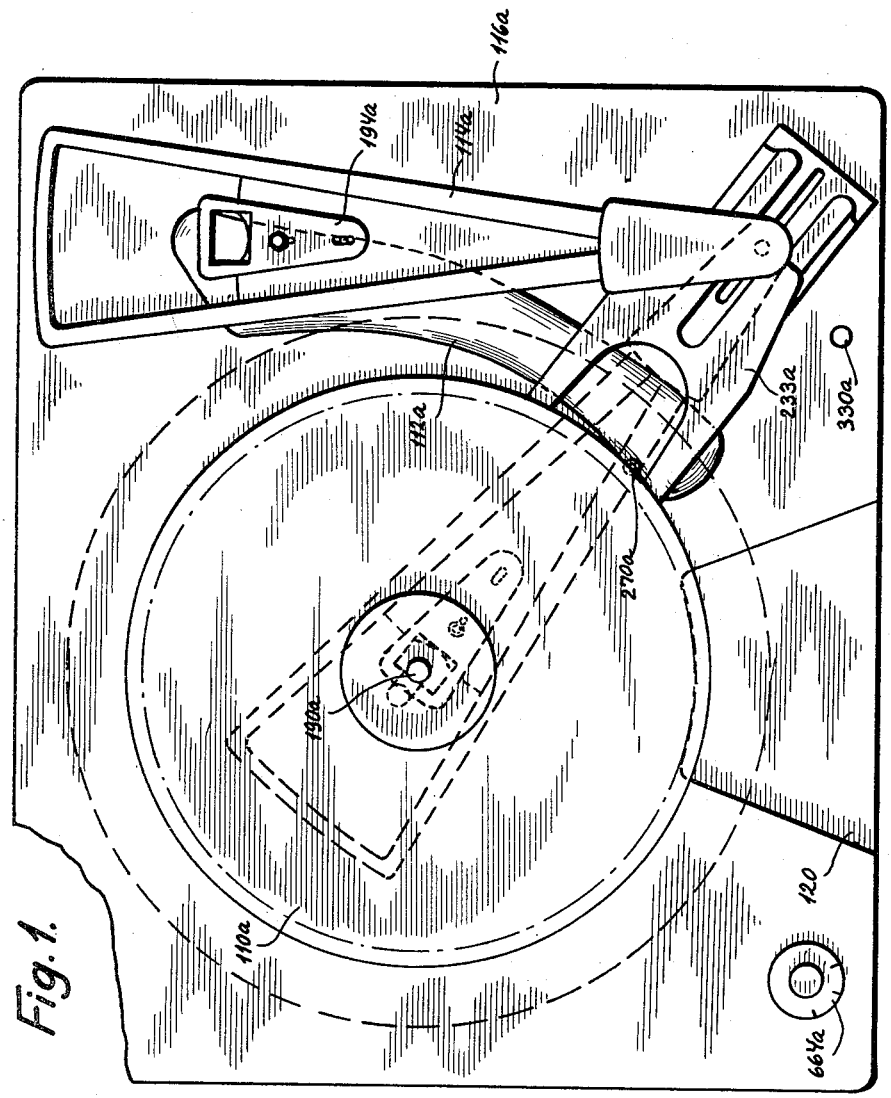

Feb. 2, 1965     H. C. HANSEN     3,168,317
RECORD SIZE SENSING APPARATUS FOR TONE ARM POSITIONING
Original Filed May 12, 1951     22 Sheets-Sheet 1

INVENTOR
Hans Christian Hansen
BY *Dicke + Craig*
ATTORNEYS

Feb. 2, 1965  H. C. HANSEN  3,168,317
RECORD SIZE SENSING APPARATUS FOR TONE ARM POSITIONING
Original Filed May 12, 1951  22 Sheets-Sheet 2

INVENTOR
Hans Christian Hansen
BY
Dicke + Craig
ATTORNEYS

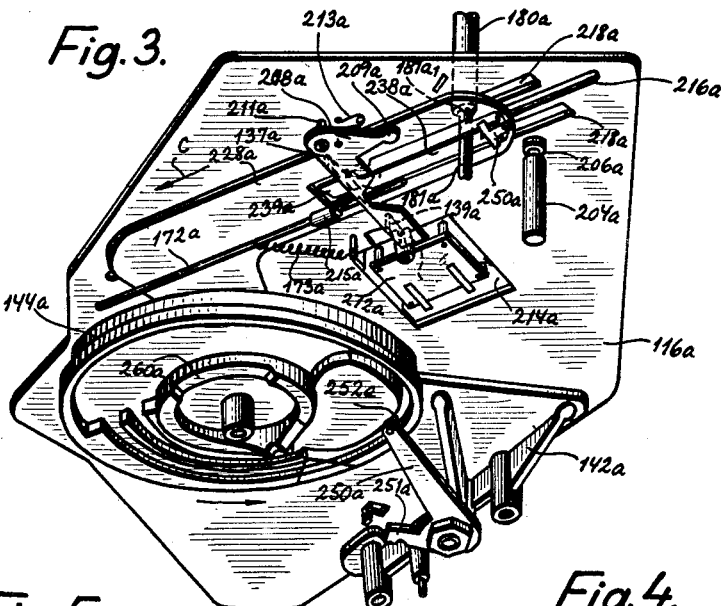

Feb. 2, 1965  H. C. HANSEN  3,168,317
RECORD SIZE SENSING APPARATUS FOR TONE ARM POSITIONING
Original Filed May 12, 1951  22 Sheets-Sheet 4
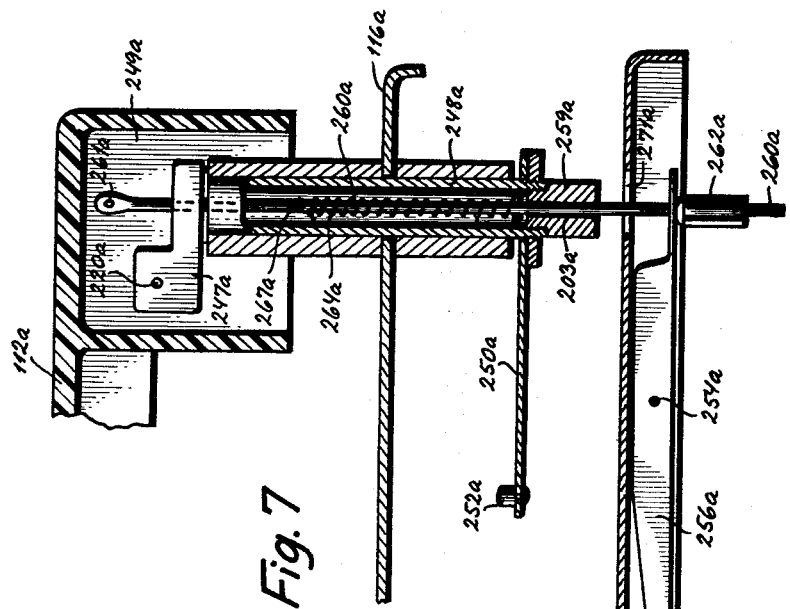
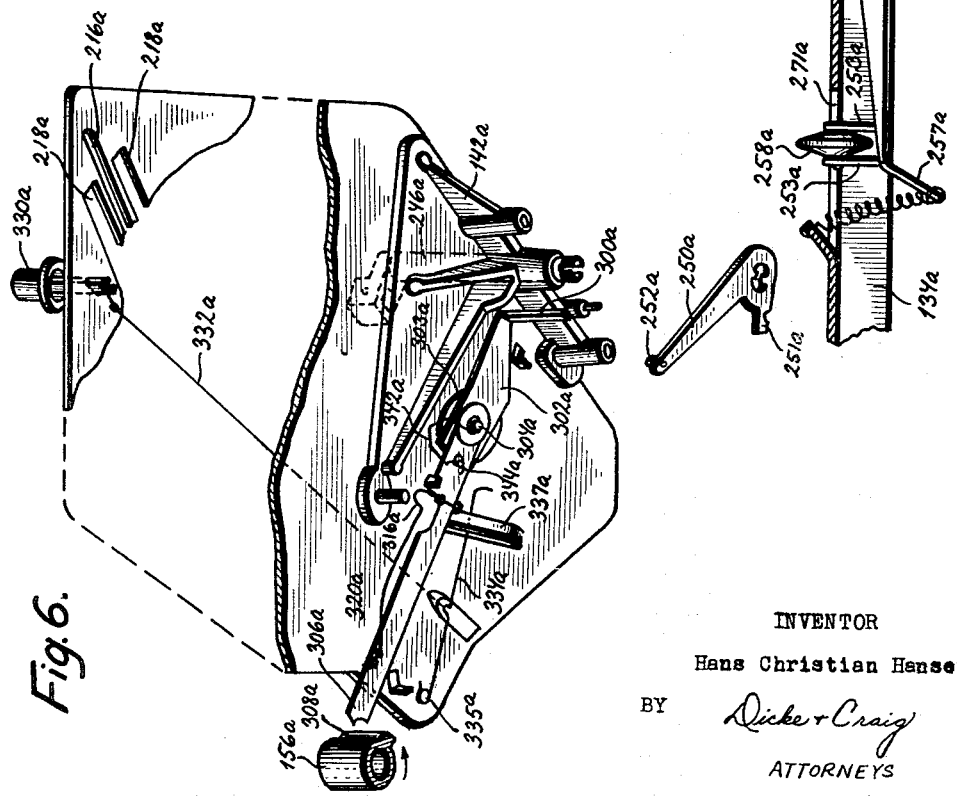
INVENTOR
Hans Christian Hansen
BY
*Dicke & Craig*
ATTORNEYS Feb. 2, 1965 H. C. HANSEN 3,168,317
RECORD SIZE SENSING APPARATUS FOR TONE ARM POSITIONING
Original Filed May 12, 1951 22 Sheets-Sheet 5
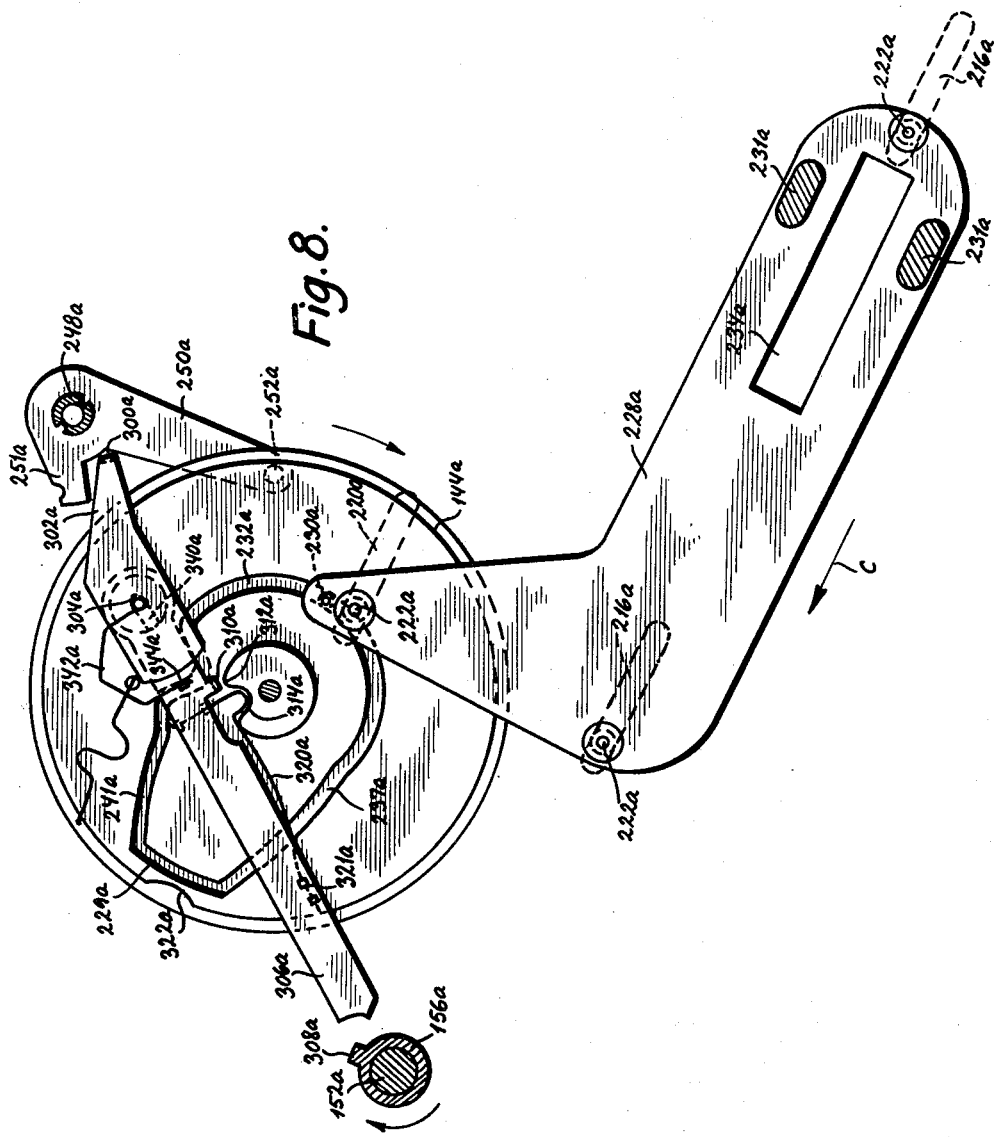
INVENTOR
Hans Christian Hansen
BY Dicke + Craig
ATTORNEYS INVENTOR
Hans Christian Hansen
BY Dicke + Craig
ATTORNEYS

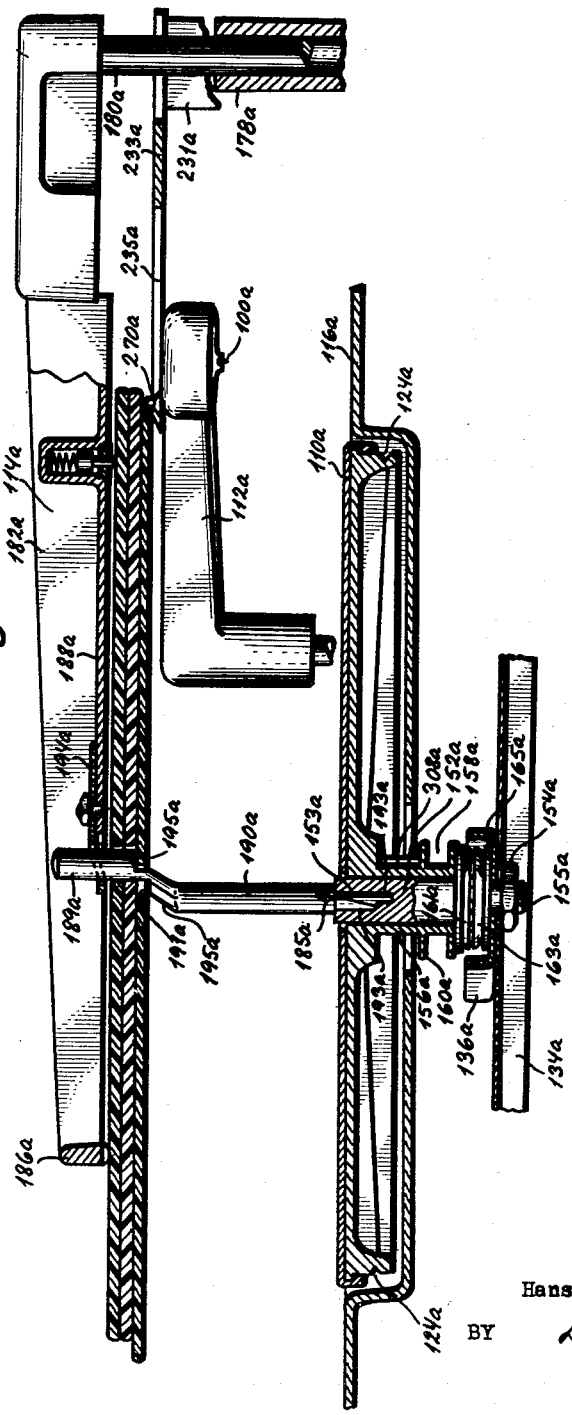

Feb. 2, 1965  H. C. HANSEN  3,168,317
RECORD SIZE SENSING APPARATUS FOR TONE ARM POSITIONING
Original Filed May 12, 1951  22 Sheets-Sheet 8
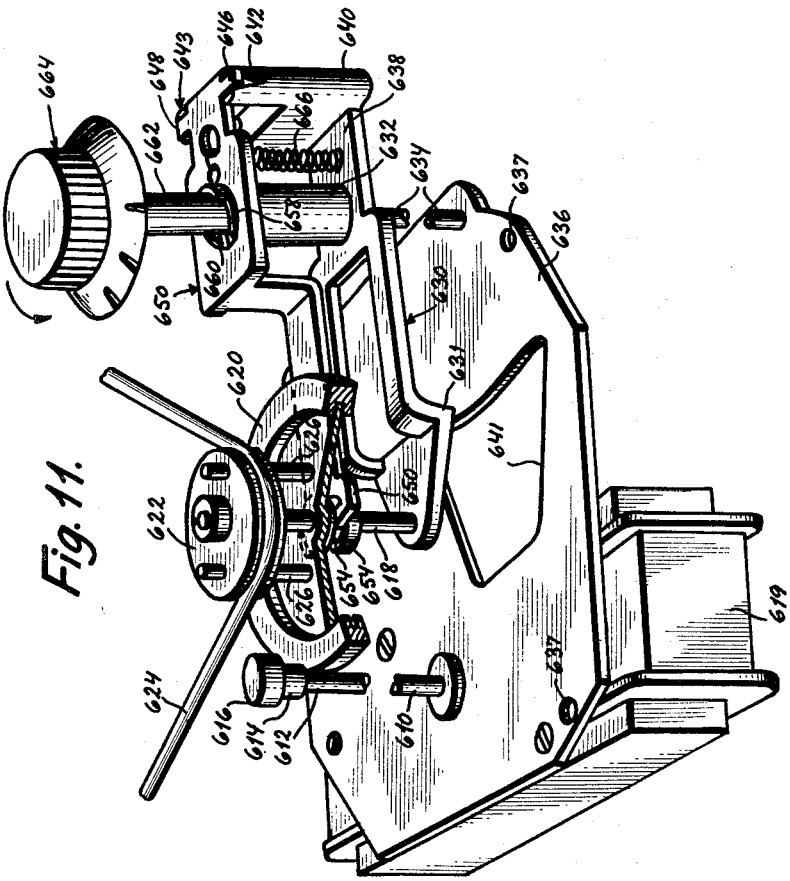
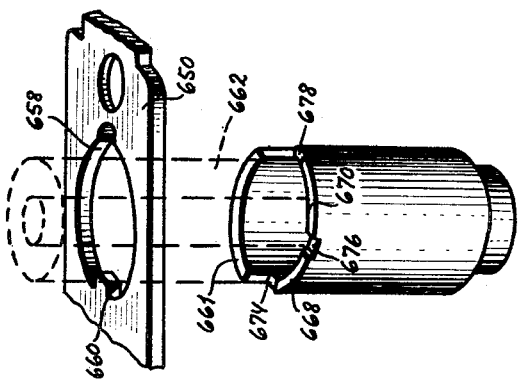
INVENTOR
Hans Christian Hansen
BY *Dicke + Craig*
ATTORNEYS Feb. 2, 1965     H. C. HANSEN     3,168,317
RECORD SIZE SENSING APPARATUS FOR TONE ARM POSITIONING
Original Filed May 12, 1951     22 Sheets-Sheet 9

INVENTOR

Hans Christian Hnasen

BY *Dicke + Craig*

ATTORNEYS

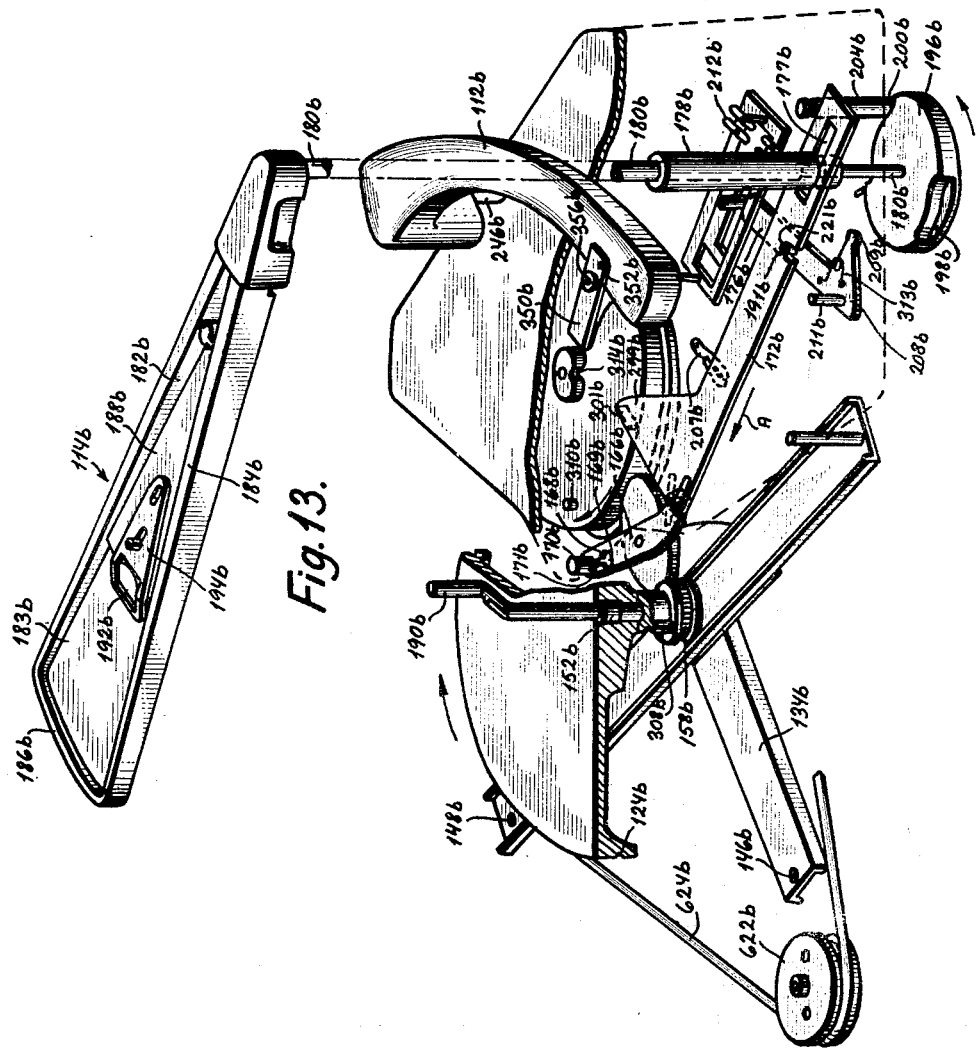

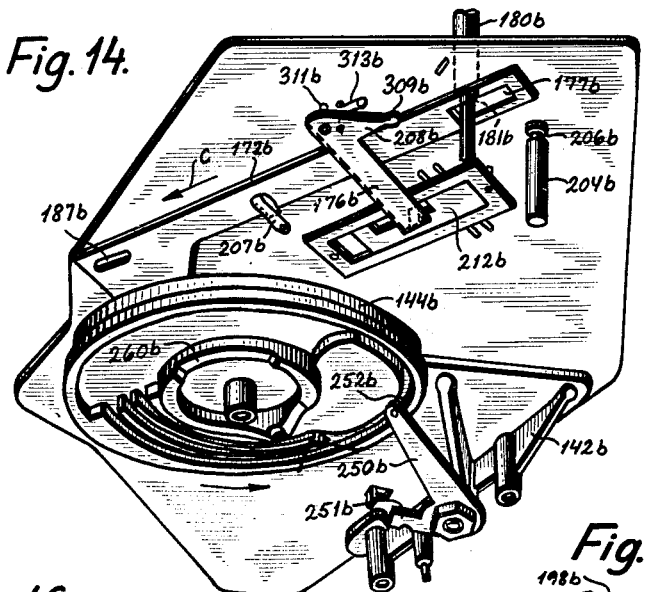
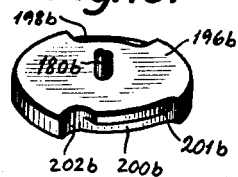
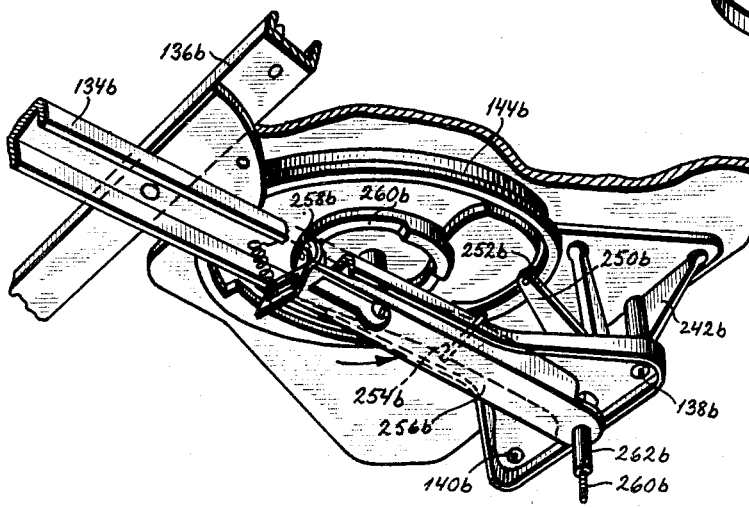

Feb. 2, 1965 H. C. HANSEN 3,168,317
RECORD SIZE SENSING APPARATUS FOR TONE ARM POSITIONING
Original Filed May 12, 1951 22 Sheets-Sheet 13

INVENTOR
Hans Christian Hansen
BY Dicke + Craig
ATTORNEYS

Feb. 2, 1965  H. C. HANSEN  3,168,317
RECORD SIZE SENSING APPARATUS FOR TONE ARM POSITIONING
Original Filed May 12, 1951  22 Sheets-Sheet 14

INVENTOR.
Hans Christian Hansen
BY Dicke & Craig
ATTORNEYS

Feb. 2, 1965  H. C. HANSEN  3,168,317
RECORD SIZE SENSING APPARATUS FOR TONE ARM POSITIONING
Original Filed May 12, 1951  22 Sheets-Sheet 15
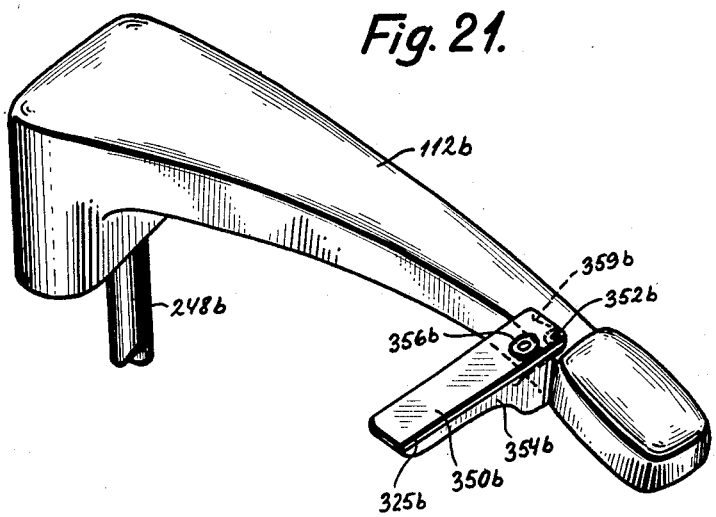
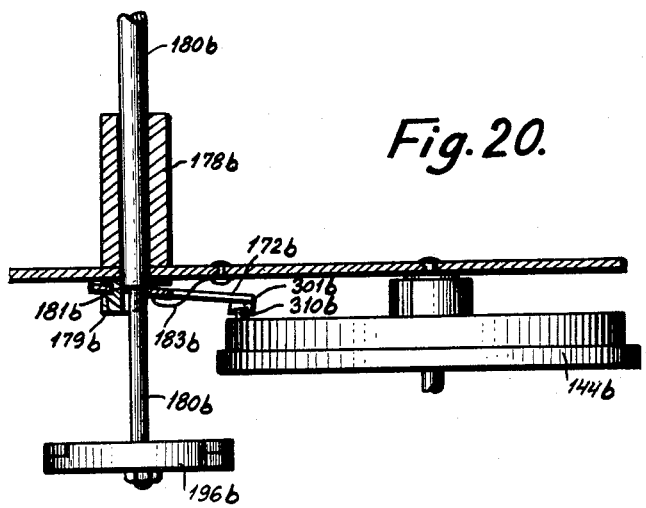
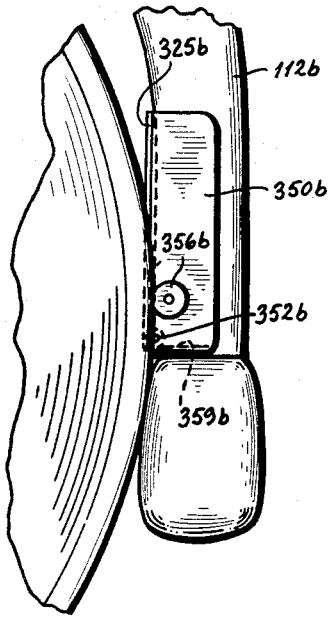
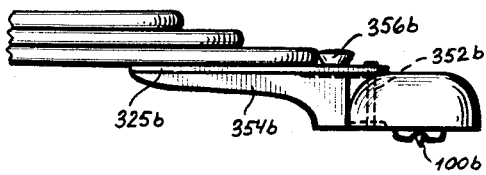
INVENTOR
Hans Christian Hansen
BY Dicke & Craig
ATTORNEYS Feb. 2, 1965 H. C. HANSEN 3,168,317
RECORD SIZE SENSING APPARATUS FOR TONE ARM POSITIONING
Original Filed May 12, 1951 22 Sheets-Sheet 16

INVENTOR
Hans Christian Hansen
BY Dicke & Craig
ATTORNEYS

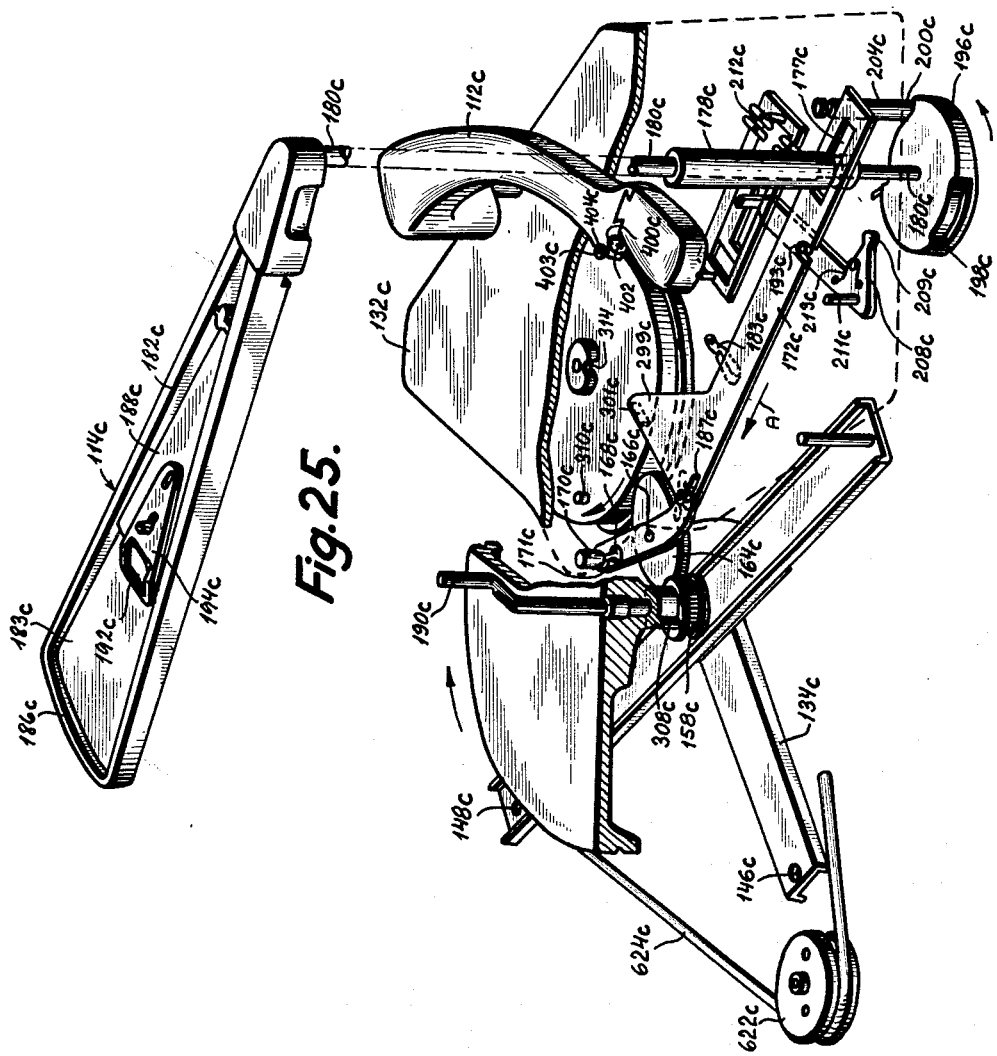

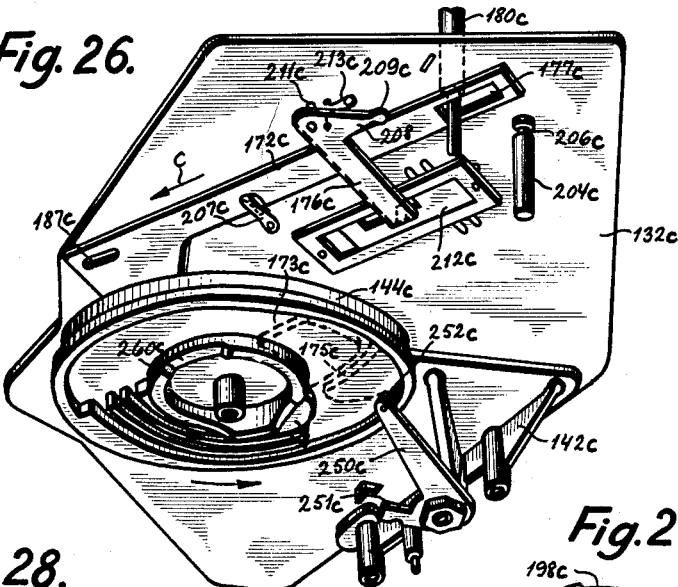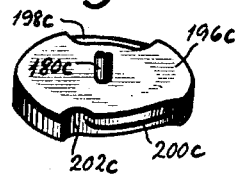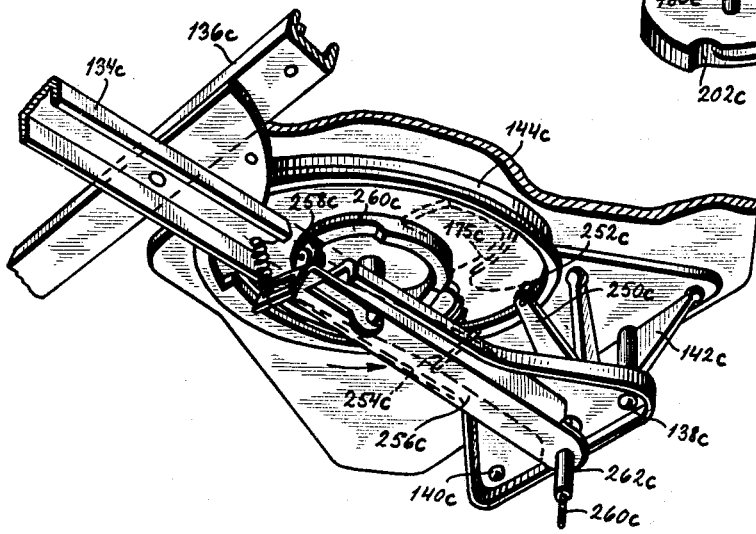

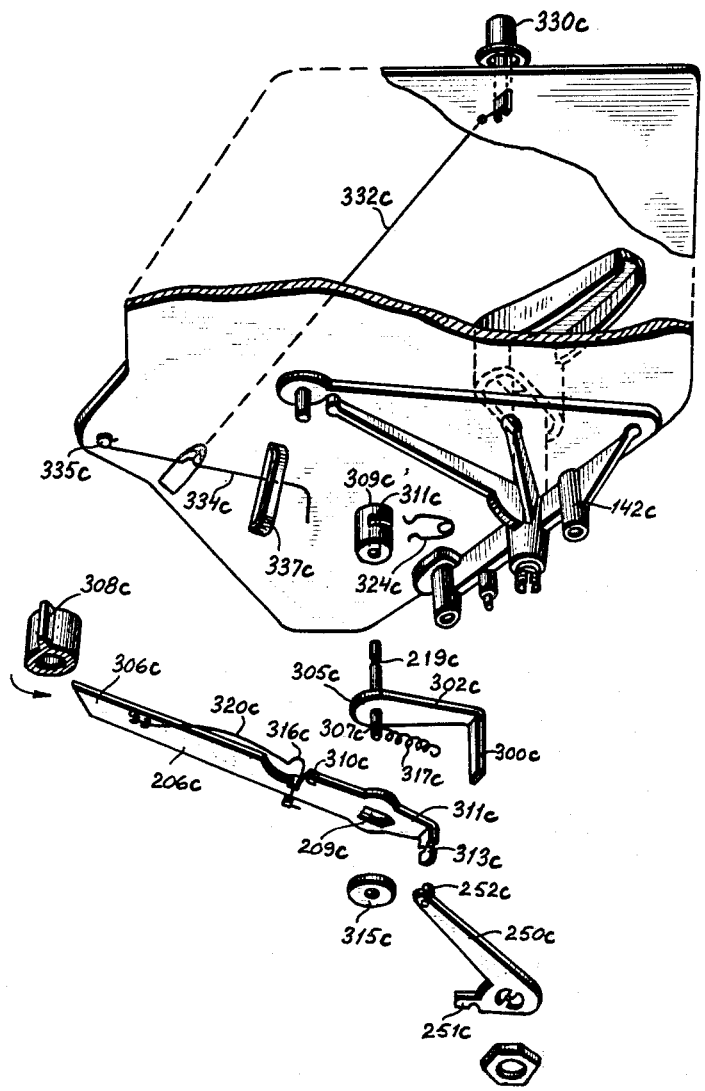

Feb. 2, 1965  H. C. HANSEN  3,168,317
RECORD SIZE SENSING APPARATUS FOR TONE ARM POSITIONING
Original Filed May 12, 1951  22 Sheets-Sheet 20

INVENTOR
Hans Christian Hansen
BY Dicke & Craig
ATTORNEYS

Feb. 2, 1965 H. C. HANSEN 3,168,317
RECORD SIZE SENSING APPARATUS FOR TONE ARM POSITIONING
Original Filed May 12, 1951 22 Sheets-Sheet 21
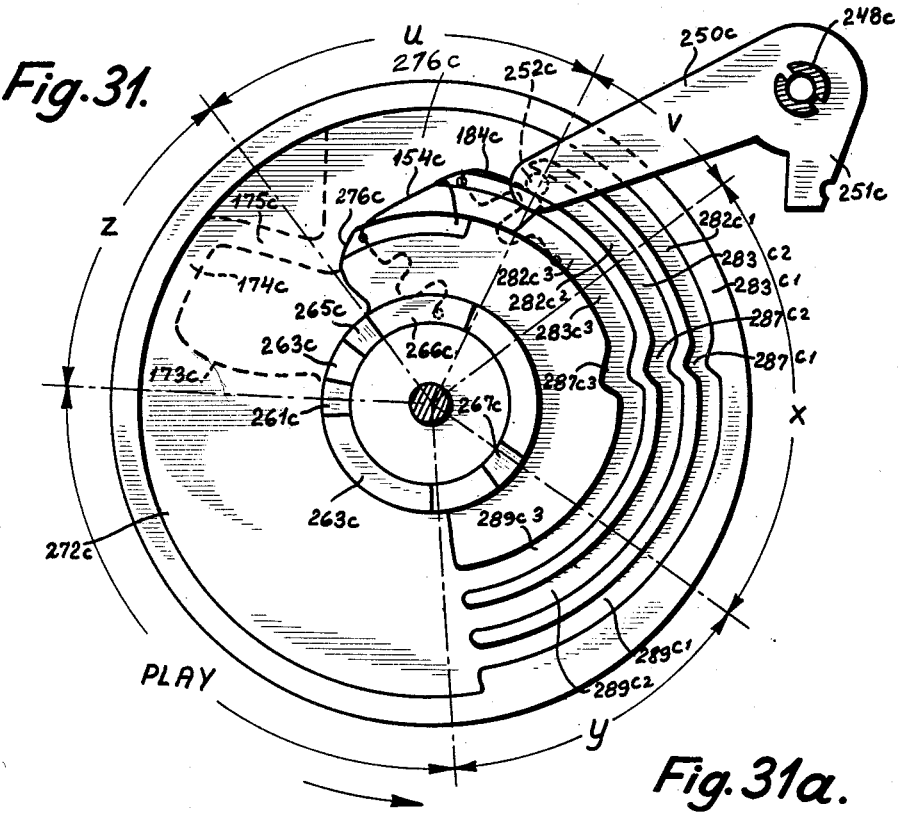
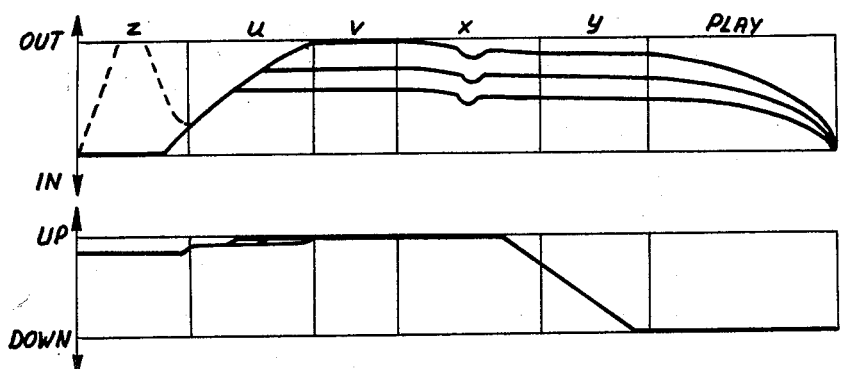
INVENTOR
Hans Christian Hansen
BY Dicke & Craig
ATTORNEYS

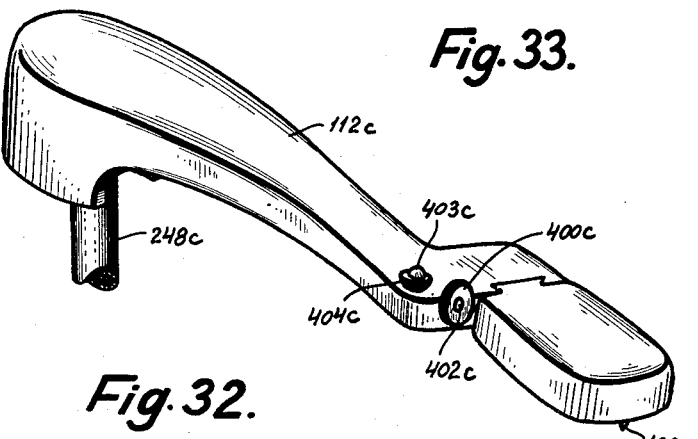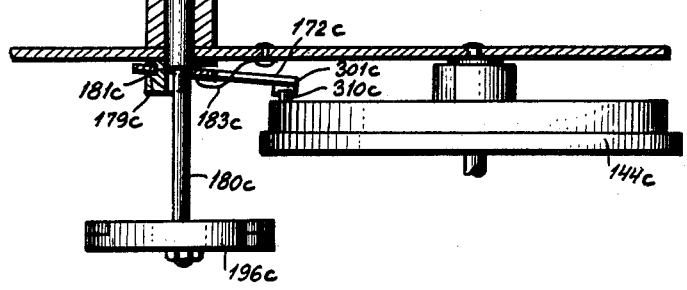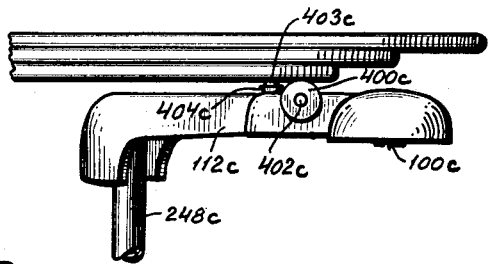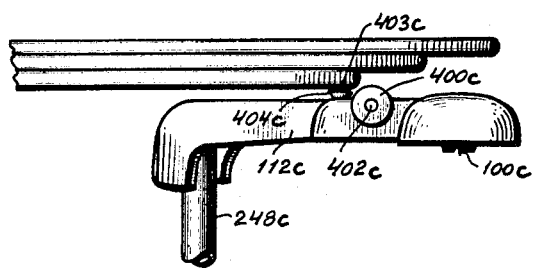

United States Patent Office 3,168,317
Patented Feb. 2, 1965

3,168,317
RECORD SIZE SENSING APPARATUS FOR
TONE ARM POSITIONING
Hans Christian Hansen, 14 Christiansholmsvej,
Copenhagen, Denmark
Continuation of application Ser. No. 225,946, May 12,
1951. This application Sept. 19, 1960, Ser. No. 57,069
42 Claims. (Cl. 274—10)

This application is a continuation of my application Ser. No. 225,946, filed May 12, 1951, and now abandoned.

It is a purpose of my invention to provide a record changing phonograph for playing a plurality of records of different sizes which is simple in construction and reliable in operation.

It is a further purpose of my invention to provide a phonograph for playing records of different sizes in which the necessity of having a separate feeler arrangement capable of feeling the size of the next record to be played is avoided.

Still a further purpose of the invention is to provide a phonograph for playing records of different sizes in which the tone arm is moved during the change cycle between an end-of-play position and a start-of-play position depending on the size of the next record to be played, and in which the travel of the tone arm is used for feeling the size of the next record to be played.

Still a further purpose of the invention is to provide a record size feeler and tone arm movement control system operable to move the tone arm in a path during the change cycle of a phonograph for playing a plurality of records of different sizes which enables the tone arm to feel the size of the next record to be played, and in response to such feeling to land the tone arm on the record in start-of-play position, depending on the size of the record.

Figure 2:
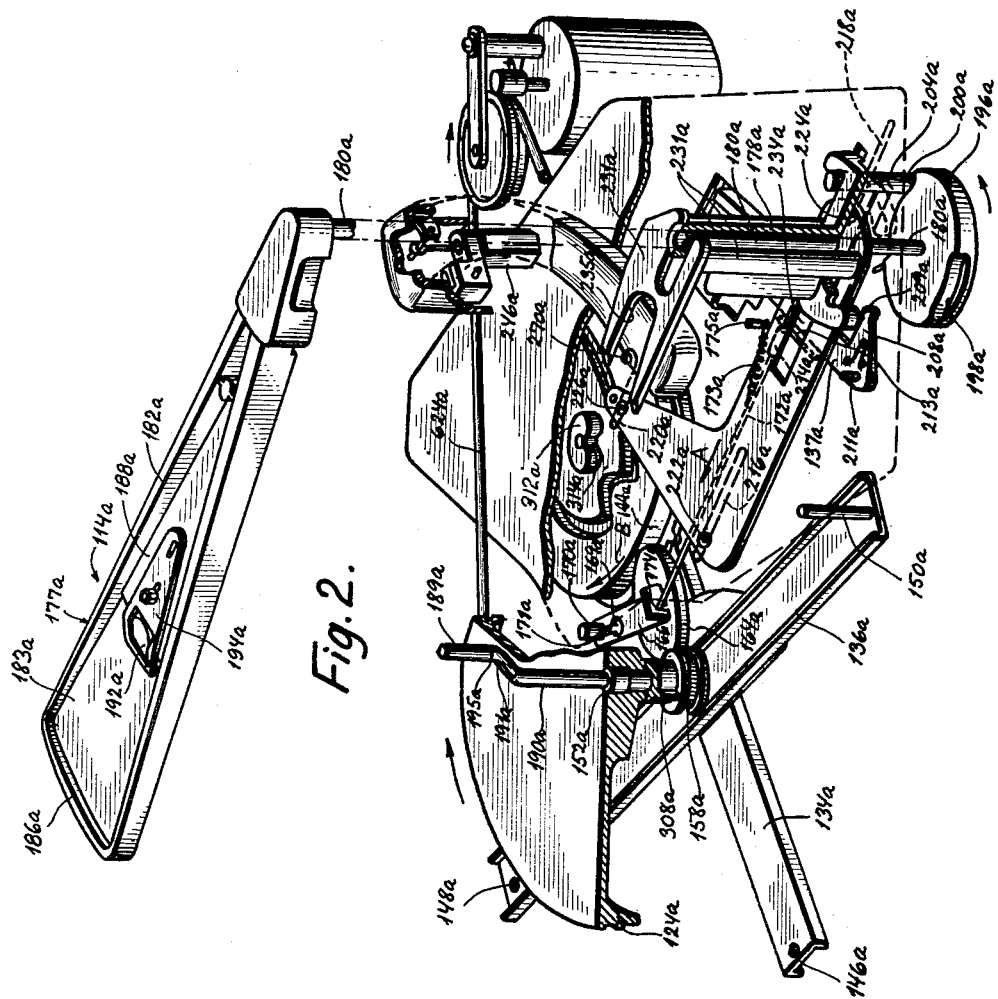
Figure 9:
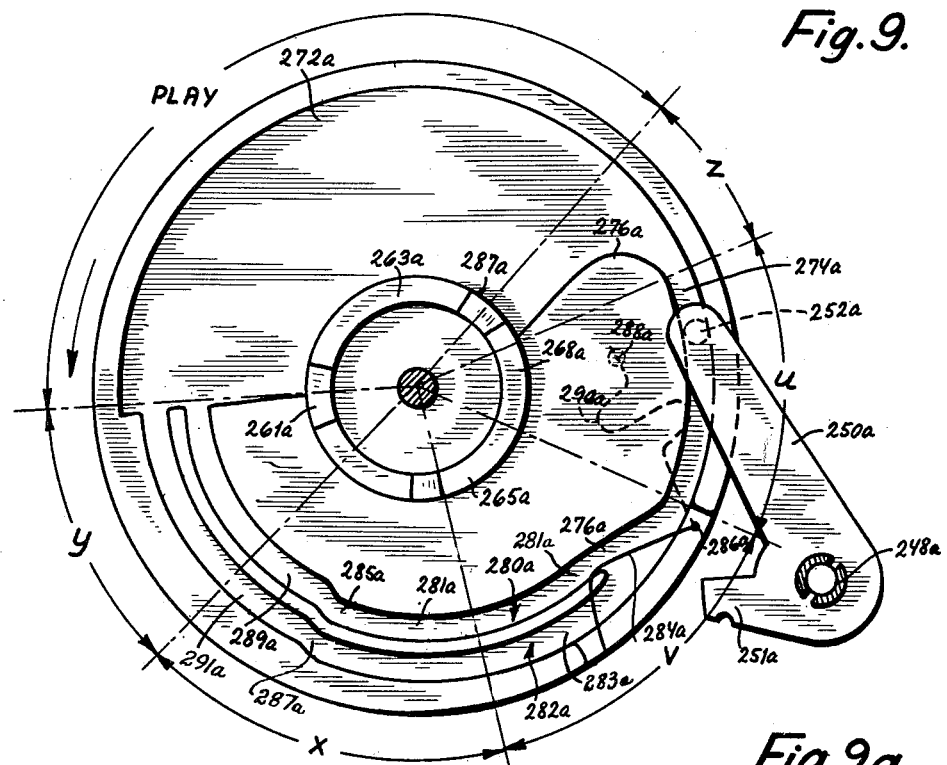
Figure 9A:
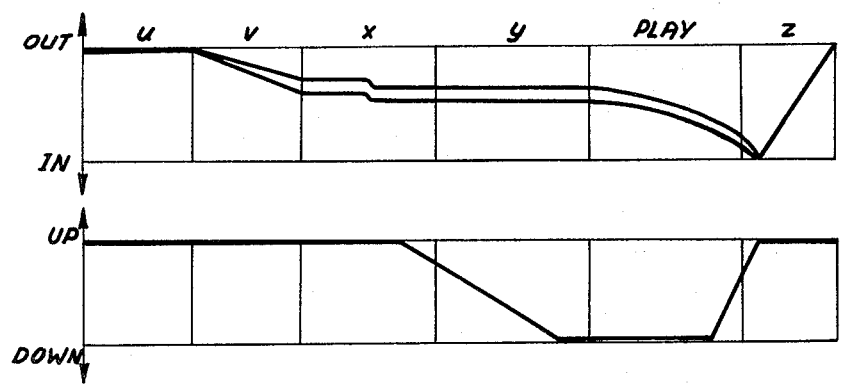
Figure 12:
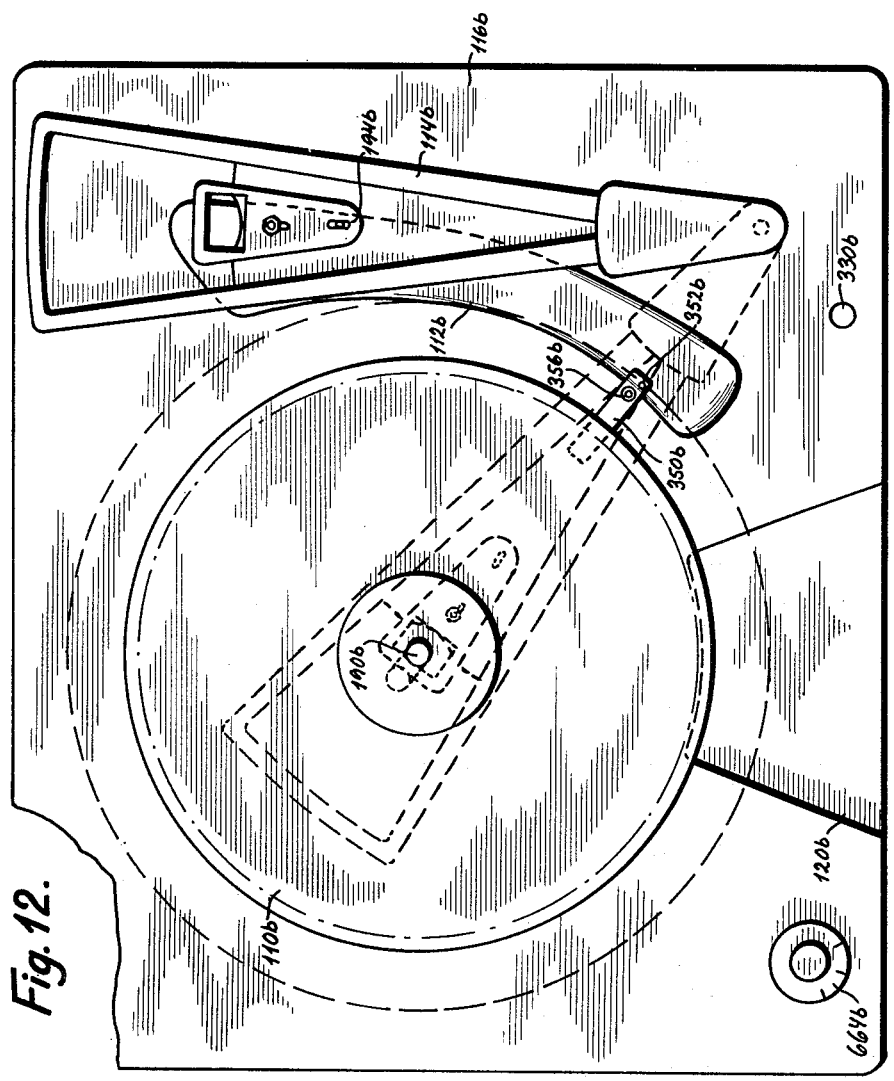
Figure 17:
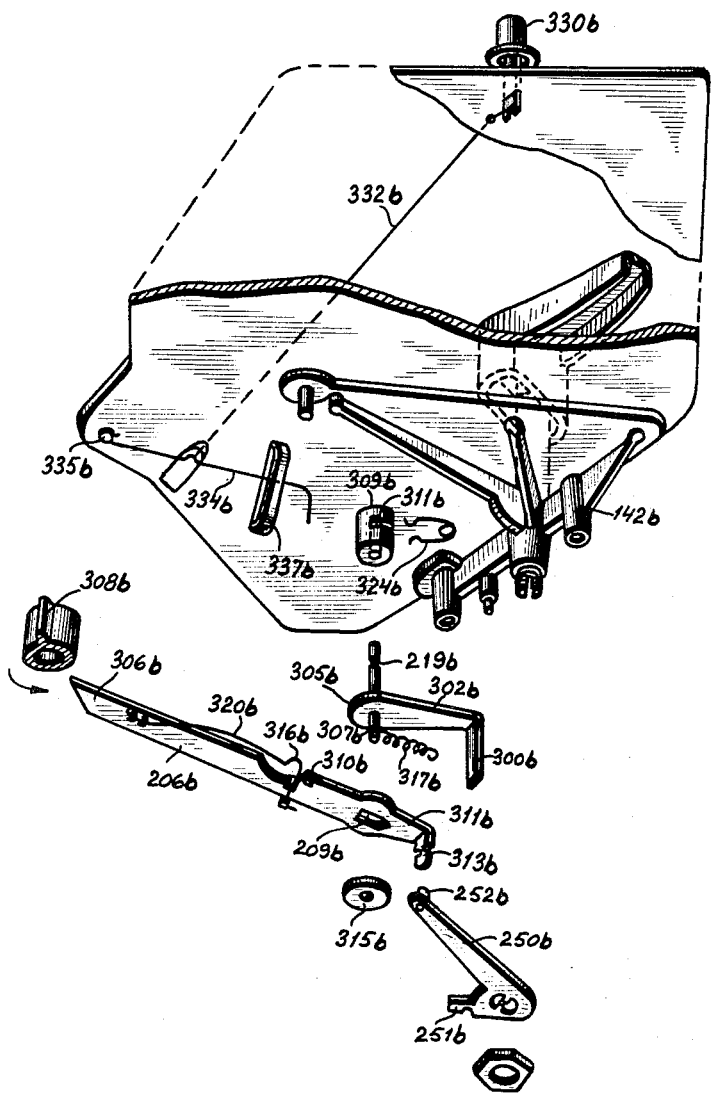
Figure 18:
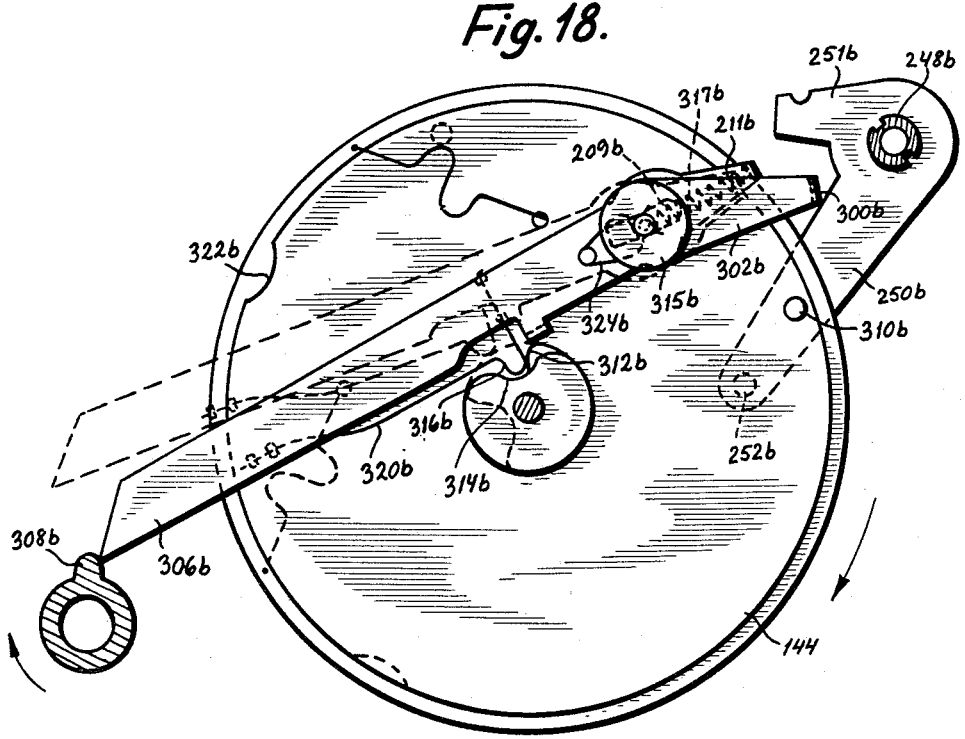
Figure 18A:
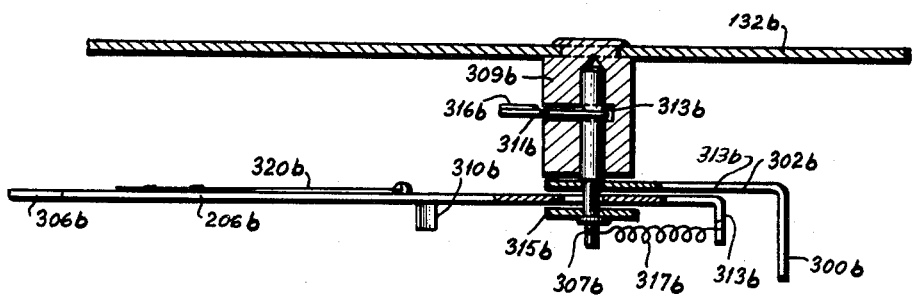
Figure 19:
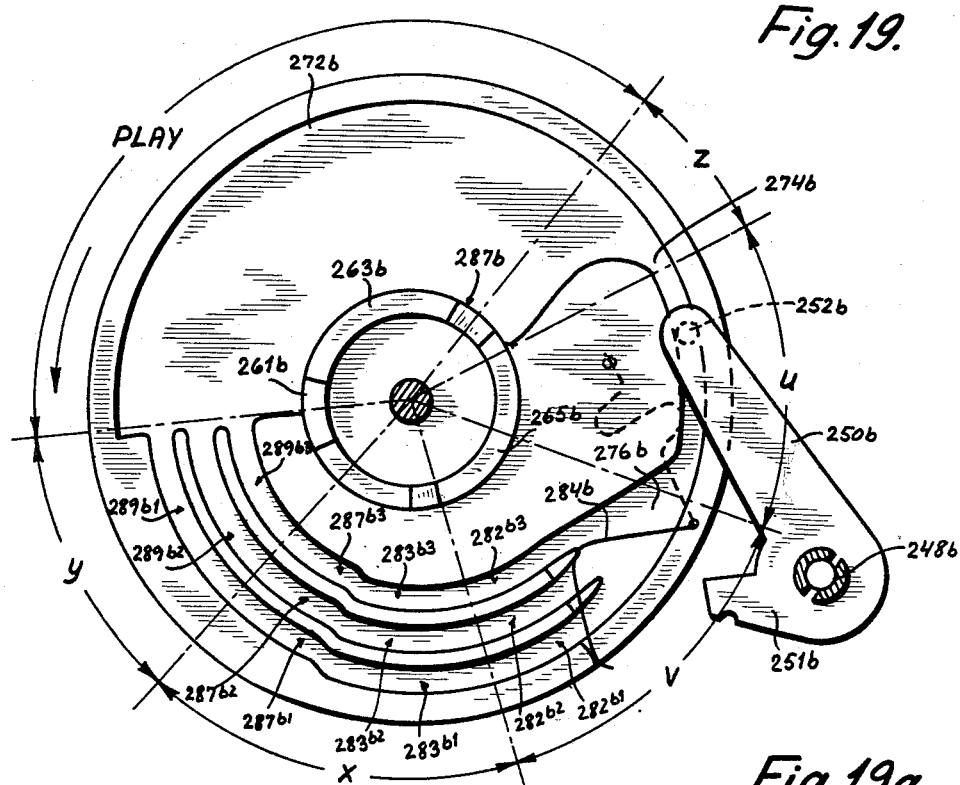
Figure 19A:
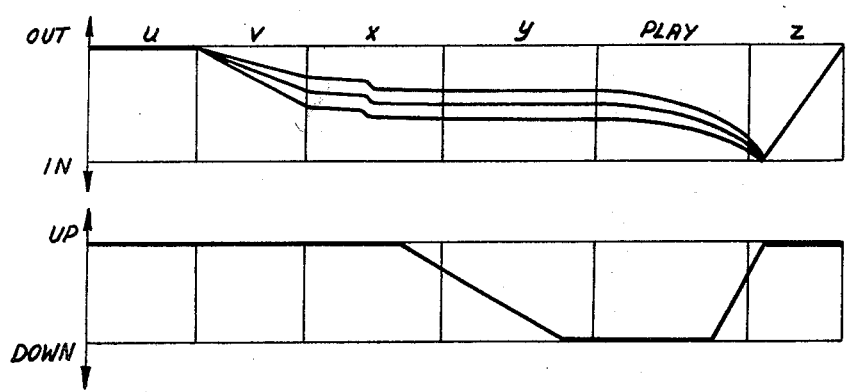

The invention will now be described in detail with reference to the accompanying drawing, in which FIGURE 1 is a plan view of an automatic phonograph according to the invention in one embodiment, FIGURE 2 is a perspective top view, partly in section, of the cycle control mechanism of the phonograph shown in FIGURE 1 with the base plate removed, FIGURE 3 is a perspective view of a part of the cycle control mechanism and its surrounding parts in the embodiment shown in FIGURE 1 seen from the bottom side of the phonograph, FIGURE 4 is a detail of the start and stop mechanism, FIGURE 5 is a perspective view of the cycle control mechanism and the members controlling the raising and lowering of the tone arm in the embodiment shown in FIGURES 2 and 3 seen from the bottom, FIGURE 6 is a perspective view of the trip starter mechanism in the embodiment shown in FIGURE 2 seen from the bottom, FIGURE 7 is a partial axial cross sectional view, on an enlarged scale, through the axis of the tone arm spindle structure and showing the parts of the mechanism which controls the vertical movement of the tone arm, FIGURE 8 is a plan view of the trip starter mechanism and apertaining parts seen from the top, FIGURE 9 is a plan view of the tone arm control cam mechanism showing the tone arm swinging track arrangement, FIGURE 9a is a diagram illustrating the tone arm movement cycles, FIGURE 10 is a partial axial cross sectional view, on an enlarged scale, taken in a plane extending through the axes of the turntable and of the tone arm structure and showing the turntable center showing a part of the phonograph, FIGURE 11 is a perspective view of the motor driving mechanism, FIGURE 11a is a partial perspective view, on an enlarged scale and showing the speed selector of the motor driving mechanism, FIGURE 12 is a plan view of another embodiment of a phonograph according to the invention, FIGURE 13 is a perspective top view, partly in section, of the cycle control mechanism of the phonograph shown in FIGURE 12, FIGURE 14 is a perspective view of the cycle cam mechanism and its surrounding parts in the embodiment shown in FIGURE 12 seen from the bottom, FIGURE 15 is a detail of the stop and start mechanism, FIGURE 16 is a perspective view of the cycle cam mechanism and the tone arm lifting control mechanism in the embodiment shown in FIGURE 12, FIGURE 17 is a perspective exploded view of the trip starter mechanism of the embodiment shown in FIGURE 12, FIGURE 18 is a plan view, on an enlarged scale of the trip starter mechanism shown in FIGURE 17, FIGURE 18a is a vertical section through a part of the mechanism shown in FIGURE 18, FIGURE 19 is a plan view of the cycling cam mechanism of the embodiment shown in FIGURE 12, FIGURE 19a is a diagram illustrating the tone arm movements, FIGURE 20 is a partial axial cross sectional view, on an enlarged scale, taken in the plane extending through the axes of the tone arm structure and of the cam disc and showing the details of the automatic switch-off mechanism of the embodiment shown in FIGURES 12–18 in vertical section, FIGURE 21 is a perspective view of the tone arm in the embodiment shown in FIGURES 12–18.

The tone arm is supported on the top of a hollow spindle 248a which is the main part of a tone arm spindle assembly and which further is rotatable in the bushing 246a. At the top end of the hollow spindle a bracket 247a is arranged on which the tone arm is pivotally supported at 220a for being raised and lowered. The rear end of the tone arm is formed with a downwardly open cavity 249a which surrounds the top of the tone arm spindle assembly. A rod or spindle 260a extends through the hollow spindle 248a and is at the top end by means of a transverse pin 261a pivotably connected with the tone arm so as to cause the tone arm to be raised by being pivoted about the pin 220a when the rod 260a is pulled downwards.

The tone arm spindle structure further includes a cam track follower pin 252a on a cam track follower arm 250a which extends radially from the lower end of the tone arm spindle below the chassis 116a, and is connected with the tone arm spindle 248a so that swinging of the arm 250a will cause the hollow spindle 248a to turn, and thereby swinging of the tone arm. The lower end of the hollow spindle 248a is closed by means of a closure member 259a having a central bore 203a through which the rod 260a extends. The lower end of the rod 260a is screw-threaded at 269a and extends through an aperture 271a in the rail member 134a. The rail member 134a forms an auxiliary supporting base for some of the parts of the change cycle mechanism; as shown in FIGURE 7 a two-armed lever 256a, 257a is pivotally supported on a pin 254a below the rail 134a. The lever 256a has a hole through which the screw-threaded end of the rod 260a extends. On this screw-threaded end an adjustable nut 262a is aranged.

The lever 256a, 257a serves to control the raising of the tone arm by pulling the rod 260a down, when tilted, and will in the following be referred to as the raising lever. The lever 256a has a flap 257a and between this flap and the rail 134a a spring 259a is interposed, which is tensioned so as to lift the left hand end of the lever 256a, 257a, and thereby bias a roller 258a which is freely rotatable on a pair of brackets 253a, 255a and passes through an aperture 271a in the rail 134a against a lifting control track arrangement, as will be described in more detail in the following.

Record support or center spindle

In the top end of the stationary turntable spindle a central bore 153a is provided the bottom of which has a stepped portion 185a and adapted to receive and removably support the lower end of the center spindle 190a which at its lower end has a stepped portion 193a which is complementary to that of the bore 153a so as to enable the spindle to be retained stationary. The center spindle has a substantially vertical lower cylindrical portion 191a and a substantially cylindrical top portion 189a offset relative thereto. Between these two portions there is an inclined portion 195a, on the top of which a substantially horizontal upwardly facing shoulder 191a is arranged, laterally and vertically spaced from a downwardly facing shoulder 195a at the underside of the top portion 189a at a distance which is slightly more than the thickness of a phonograph record, but less than the double thickness thereof.

Tone arm moving mechanism

The main cycle control element is a cam disc 144a which, as most clearly shown in FIGURE 5, is mounted for rotation supported on the supporting rail 134a and which is designed to be driven by the engageable and disengageable gear wheel 164a to make one complete revolution betwen each playing of a record.

The arm 166a with the gear wheel 164a is kept in position to engage the gear wheel 164a against the periphery of the cam disc 144a by means of a rod 172a, the one end of which at 174a is operatively connected with the arm 166a, for instance by means of a head (not shown) which engages behind an upwardly extending flap 169a on the arm 166a, through an aperture in which extends the rod 172a. The rod 172a is connected with one end of a spring 173a, the other end of which is connected with a pin 175a which is secured to and extends below the base plate 116a. The arrangement described is so designed that when the rod 172a by means of the spring 173a is pulled in opposite direction of the arrow A, the gear wheel 164a will be engaged between the bottom of the annular recess 168a on the rotatable turntable spindle 156a which forms a continuously rotating driving wheel and the periphery of the cam disc 144a, so that the rotation of the turntable is transmitted to the cam disc.

In order to disengage the gear wheel 164a from the turntable spindle 156a after one complete revolution of the cam disc, the latter has a peripheral recess 322a which is deep enough to receive the gear wheel 164a and thereby disengage it from the driving spindle 156a.

The cam disc has a group of cam tracks comprising a cam track or recess 272a in which the track follower 252a is allowed to move freely when the tone arm stylus is moved in the record groove during the playing of a record. The recess 272a will therefore in the following be referred to as the playing recess. The other cam tracks will be described in the sequence in which they are followed by the track follower 252a during the rotation of the cam disc which takes place anticlockwise in FIGURE 9. The playing recess 272a has an outwardly leading end wall 276a and behind this it narrows into an exterior cam track 274a which is substantially concentric with the cam disc and arranged near the periphery thereof (outer position). The track 274a continues in an inwardly leading track 276a which, as will be apparent from the following description of the mode of operation, effectively provides a feeler track operable to swing the tone arm to engage its feeler abutment with the edge of the next record and thereby determine the correct start-of-play position, the exterior wall of which is in the form of a spring member 284a. The track 276a communicates with an interior track 280a as well as with an exterior track 282a the entrance to which can be opened against the action of the spring 284a; the track 280a corresponds to phonograph records of 10 inch size, while the track 282a corresponds to records of 12 inch size. The spring 284a is in the embodiment shown in the form of a wire-spring which extends through a hole 286a in the cam disc and on the other side of the cam disc has one or more bent portions 290a at the end 288a of which the spring is secured to the cam disc. The two cam tracks 280a and 282a are of similar configuration and are merging into the playing recess 272a so as to guide the cam track follower 252a to the playing recess through a plurality of different paths at the end of each of which the tone arm is landed with its stylus in correct engagement with the initial sound groove of that record, the size of which has been tested by engaging an abutment 270a on the tone arm against the edge of the record in the manner to be more fully described in the following during that part of the cycle which corresponds to the passage of the cam track follower through the track 276a. Therefore, in the following the track portion 276a will be referred to as the feeler track and the tracks 280a, 282a as the landing track arrangement.

The initial portions of the tracks 280a and 282a are concentric with the cam disc at 281a, 283a. Thereafter the tracks continue in inwardly leading portions 285a and 287a followed by inwardly leading landing portions 289a and 291a which are merging into the playing recess 272a.

Near the center of the cam disc cam portions operable to control the raising and lowering of the tone arm are provided in the form of a concentric cam arrangement generally referred to as 287a adapted to engage the roller 258a on the lever 256a in order to raise and lower the tone arm. The cam arrangement 287a comprises a tone arm lowering portion 260a on each side of which upwardly sloping portions 261a and 263a respectively extend and communicates with a tone arm raising cam portion 265a. The different cam portions are so disposed relative to the various portions of the tracks which control the swinging of the tone arm that the roller 258a is pressed down to the lowest tilted position of the raising lever 256a, 257a by means of the cam portion 260a to allow playing of a record when the track follower 252a moves in the playing recess, and that the roller 258a by means of the spring 259a is pressed against the cam portion 265a, which corresponds to raised position of the tone arm when the track follower 252a is moved through the cam tracks 274a and 276a. For further details see the diagram, FIGURE 9a, which shows the relation between tone arm movements in and out or up and down respectively.

Stop and start control mechanism

The ballast arm 177a is, as illustrated in FIGURES 1 and 2, in the form of a triangular structure with an aperture 192a designed to receive the top end 189a of the center spindle 190a when the ballast arm engages the top of a stack of records to retain them horizontally, as will be more fully explained in the following.

The ballast arm is secured to the top end of a vertical spindle 180a which is mounted for rotation in a bushing 178a secured to the chassis 116a. The spindle 180a extends downward through the base plate and carries at its lower end a disc 196a which is shown in FIGURE 2 and in more detail in FIGURE 4. One side of this disc is provided with a circular recess 198a which extends from the top side leaving a rib 199a at the bottom side of the disc. The bottom of this recess is substantially concentric with the periphery of the disc. Substantially opposite this recess 198a a further recess 200a extends from the bottom side of the disc, leaving a rib 201a adjacent the top side of the disc which is concentric with the disc but of smaller radius. At the left hand end of this rib, as seen in FIGURE 4, the recess 200a extends through the rib at 202a. The disc 196 cooperates with a vertical pin 204a which is secured to and extends below the base plate. This pin 204a has as more clearly shown in FIGURE 3, near its top end, an annular groove 206a designed to receive and be engaged by the rib 201a. It will be understood that when the spindle 180a with the disc 196a is lifted, so much that the rib 201a can be engaged in the annular groove 206a, this allows a swinging of the spindle 180a and thereby a rotation of the arm in raised position above the stack of records.

When the arm 114a is in alignment with the central supporting spindle 190a, the recess 202a aligns with the pin 204a so that the spindle 180a in this position can be lowered to engage the ballast arm 114a with the stack of records as shown in FIGURE 10.

The other recess 198a receives a nose 209a on an arm 208a which is swingingly arranged about a pivot pin 211a which is secured to and extends below the base plate 116a. The arm 208a is provided with an upward flap 213a with a hole through which the end of that rod 172a extends, the other end of which is operatively connected with supporting arm 166a for the cam disc gear wheel 164a. Furthermore, the arm 208a is provided with a projection 139a which cooperates with a bifurcated actuator member 210a for an electric switch 212a which is secured to the base plate and arranged in an aperture 214a therein. The switch is included in the electric circuit of the driving motor to switch the same on and off. The parts are arranged in such a manner that when the ballast arm 114a is swung to the position outside the stack of records, the one end of the recess 198a will, by cooperating with the nose 209a, swing the arm 208a to switch the motor on.

On the rod 172a an adjustable nut 214a is arranged on a screw-threaded portion 215a and adjusted in such a manner that when the switch control arm 208a is swung to switch the motor off, the flap 213a on said arm will simultaneously engage that nut 214a and thereby push the rod in the direction of the arrow A in FIGURE 2 to disengage the gear wheel 164a from its driving position between turntable spindle and the cam disc. In the other position, i.e. when the motor is switched on, the rod 172a is, as previously explained, pulled in the opposite direction by means of the spring 173a so as to engage the driving wheel between the parts. The switch operating arm 208a is kept in each of its two exterior positions by means of a momentum spring 213a the ends of which are secured in holes in the arm and the base plate respectively.

An L-shaped slide 228a is guided by means, of pins 22a, 224a, 276a which engage in slots 216a, 218a and 220a. This slide is reciprocable in response to the rotation of the cam disk by means of a pin 230a which engages a cam track 232a in the top surface of the cam disc as shown in FIGURE 8. The long arm of the slide 228a extends substantially parallel with the rod 172a and has a slot 234a for the ballast arm passage of the spindle 180a. At this end the slide is provided with a pivot 258a for a spring-loaded lever 242a, which is normally kept in engagement with the underside of the slide member and extends within the orbits of the slot 234a so as to enable a shoulder 181a on the ballast arm spindle 180a to engage the lever 242a and pivot it downwardly to cause engagement of its free end with the switch control level flap 137a when the slide is moved in the direction of the arrow C in FIGURE 3.

The slide further carries a pair of upwardly extending arms 229a and 231a, which can move in slots (not shown) in the base plate and on the top ends of which a jib 233a extends which has its top surface substantially in the same plane as the shoulder 191a on the center spindle 190a and is directed substantially radially against the central center spindle 190a. The jib is of such an extension that when the slide is in its most interior position the end of the jib is inside the periphery of a 10 inch record supported on the center spindle and movement of the slide is so adapted that when the slide is in its most exterior position the jib is completely outside the periphery of a 12 inch record supported on the center spindle.

Figure 24:
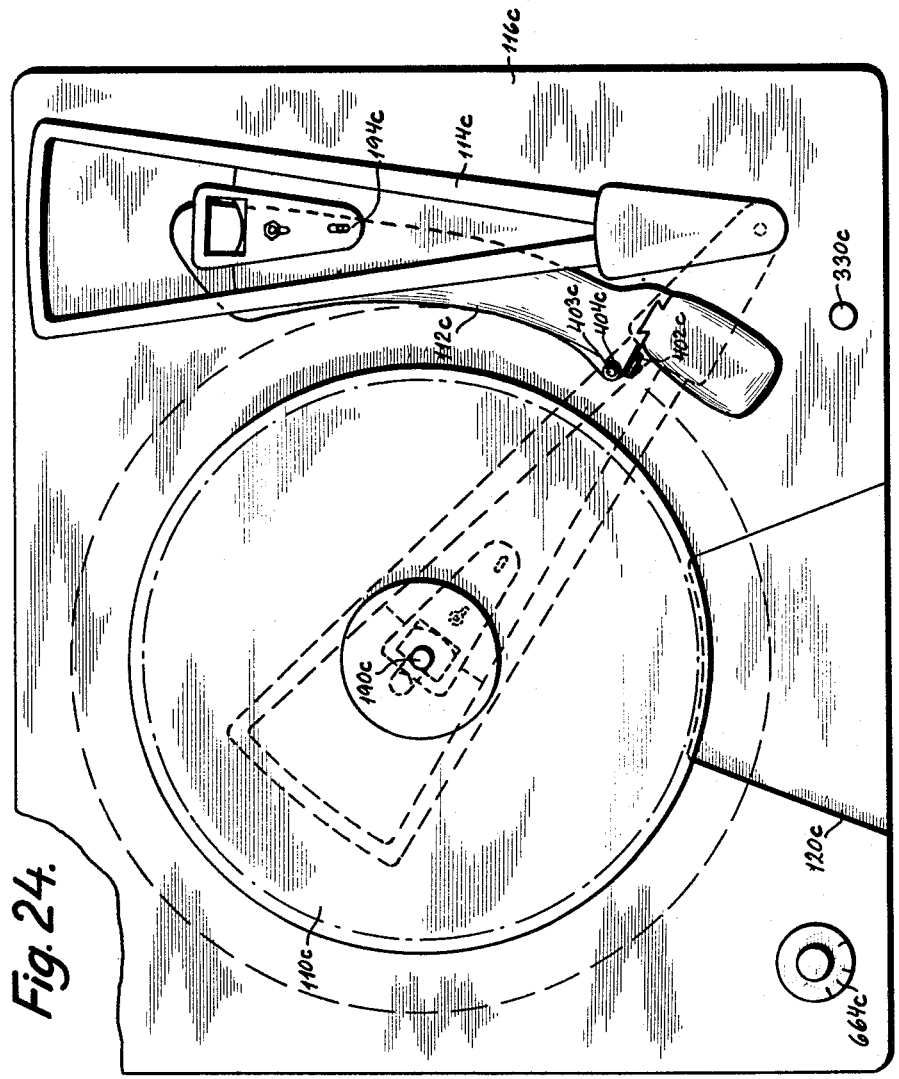
Figure 30:
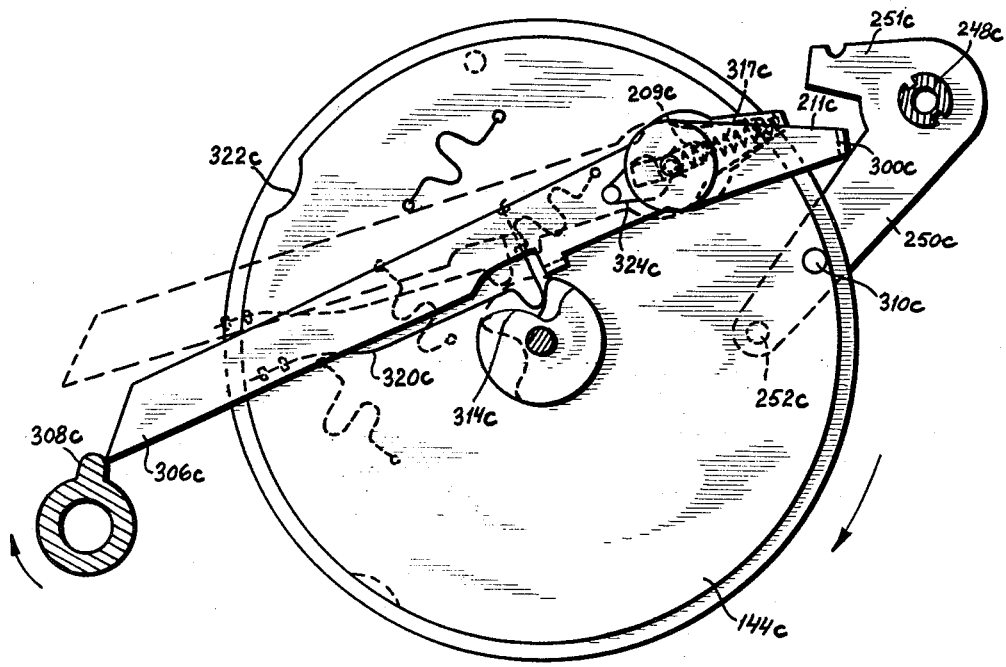
Figure 30A:
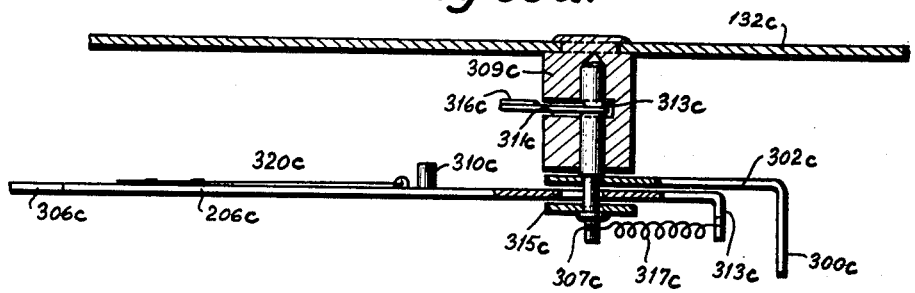

FIGURE 22 is a vertical section through the edge portion of a stack of records supported in connection with the tone arm shown in FIGURE 21, FIGURE 23 is a plan view of the tone arm shown in FIGURE 20 illustrating its engagement with a record, FIGURE 24 is a plan view of a further embodiment of an automatic phonograph according to the invention, FIGURE 25 is a perspective top view of the cycle control mechanism of the phonograph shown in FIGURE 24 seen from the top, FIGURE 26 is a perspective view of the cycle control mechanism in the embodiment of FIGURE 25 seen from the bottom, FIGURE 27 is a detail of the stop and start mechanism shown in FIGURE 26, FIGURE 28 is a perspective view of the cycling cam mechanism and the control for raising and lowering the tone arm in the embodiments shown in FIGURES 25 and 26, FIGURE 29 is a perspective view of the trip starter mechanism of the embodiment shown in FIGURES 25–28, FIGURE 30 is a plan view of the trip starter mechanism, FIGURE 29, FIGURE 30a is a vertical section through a part of the mechanism shown in FIGURE 30, FIGURE 31 is a plan view of the cycling cam mechanism of the embodiment shown in FIGURES 25–27, FIGURE 31a is a diagram illustrating the tone arm movements, FIGURE 32 is a partial axial cross sectional view, on an enlarged scale, taken through the plane extending through the axes of the tone arm structure and of the cam disc and showing the details of the automatic switch-off mechanism of the embodiments of FIGURES 25–28 in vertical section, FIGURE 33 is a perspective view of the tone arm in the embodiment shown in FIGURES 24–32, FIGURE 34 is a partial perspective view of the edge portion of a stack of records in connection with the tone arm shown in FIGURE 33 with the parts in one position, and FIGURE 35 is a partial perspective view of the tone arm and records in FIGURE 34 with the parts in another position.

In the following description the same parts in the different embodiments will be referred to by the same reference numerals with different index letters a, b and c respectively in the three embodiments of FIGURES 1–11a, 12–23 and 24–35 respectively.

Referring now more particularly to the embodiment shown in FIGURES 1–11 of the drawings, the invention here illustrated shows an automatic phonograph or record changing apparatus, which includes a base plate or chassis 116a. Above the top surface of the base plate extends the top surface of a turntable 110a, which is supported for rotation in a manner to be described in more detail in the following. Another of the main elements of the phonograph is a tone arm 112a arranged for automatic movement in a manner to be more fully described in the following and having adjacent its free end a stylus member 100a, see FIGURE 10, which is adapted to engage the sound track of a phonograph record to move in accordance with the oscillation of said sound track in order to produce electrical oscillations which are amplified and reproduced from an amplifier and sound reproducer, not shown. A further main element of the phonograph is a record stabilizing element or ballast arm 114a operable to engage the top surface of the uppermost record in a stack of records supported on a central spindle 190a and supplied one after the other to the playing position on the turntable 110a.

Still a further main element of the phonograph is a supporting member for a stack of records in the form of a center spindle 190a which extends vertically to the turntable.

These main elements are shown in plan view in FIGURE 1. The turntable may be partly embedded in a recess 98a in the base plate 116a, as shown in FIGURE 10, so that only its surface extends above the surface of the base plate. A sidewardly extending recess 120a between the front edge of the base plate and the turntable allows in this event a finger to be introduced under the records supported on the turntable in order to lift them away therefrom.

Driving mechanism

In the embodiment of the driving mechanism which is shown in detail in FIGURE 11 and is common to all the embodiments, see FIGURES 2 and 10, a groove 124 is provided in the cylindrical surface of the turntable which is adapted to receive a driving cord 624 passing over a pulley 622 on a spindle 618. The spindle 618 also carries a driving wheel or disc 620 adapted to frictionally engage a power-driven spindle 610 of an electric motor 619 which is not shown in detail. The driving mechanism to be described in detail hereinafter is especially constructed to enable the turntable to rotate with three or more different predetermined velocities. For this purpose the motor spindle 610 is provided with three sections 612, 614 and 616 of different diameters adapted to be selectively engaged by the driving wheel 620 in order to change the velocity.

In spaced relationship and substantially parallel with the spindle 610 and the spindle 618 a further spindle 634, secured to a base plate 636, is arranged having screw holes or the like 637 for mounting the driving mechanism below the base plate 616 by means of distance pieces, now shown. On the wheel or disc 620 a pair of pins 626 and 628 are arranged which extend through the pulley 622 and are guided for longitudinal displacement relative thereto by means of holes or bores in said pulley. Thereby the wheel 620 and the pulley 622 will rotate together. The spindle 618 is fixed to the free end of the arm 630, and both the wheel 620 and the pulley 622 are allowed to rotate freely on the spindle 618, the pulley 622 further being secured against longitudinal displacement relative to the pulley 618. In contra-distinction to the pulley 622, the wheel 620 is allowed to move up and down along the spindle 618. The arm 630 is carried by a bushing 632 which is guided on the pin 634 and allowed to pivot thereabout. Beyond the bushing 632 the arm 630 has an extension 638, the remote end of which is provided with a pedestal 640, the top end of which is bifurcated at 641 and 643. The forks hereof are provided with V-formed recesses, of which only the front recess 642 is shown. These recesses form bearings for oppositely directed projections 646 and 648 on a pivotable arm 650, the free end of which is bifurcated at 656 to engage a circular groove 654 on a bushing 656, which is associated with the disc or wheel 620 and arranged therebelow.

The arm 650 is provided with an aperture 658 which has an inwardly directed extension 660 which is adapted to engage a shoulder, generally referred to by 661, on the bushing 632. The bushing is provided with a top portion of reduced diameter 662 which extends upwardly through the aperture 658 and carries a control knob or the like 664 which extends above the top surface of the general base plate 116a, see FIGURE 1. Between the arm 650 and the rear end 638 of the arm 630 a spring 666 is provided to urge the arm 650 against the shoulder 661 of the bushing 632. The bushing 632 is rotatable with respect to the arm 630. The shoulder 661 is further composed of different sections 668 and 670 respectively, each forming a part of a screw surface. Between the two sections 668 and 670 a notch 676 is arranged. The width of the notch 676 corresponds to the width of the projection 660. At the ends of the sections 668 and 670 further notches 674 and 678 are provided, the widths of which also correspond to the widths of the projection 660. As previously mentioned, the whole arm 630, 636 is arranged to pivot about the pin 634. The free end of the arm 630 is fulcrumed at 631 and extends into an aperture 637 through the base plate 636.

Under normal driving conditions the driving cord 624, which may be of rubber or another elastic material, is tightened in order to engage the driving wheel 620 against one of the sections 612, 614, or 616 with the result that a rotation of the motor spindle 610, i.e. the wheel 620 to the turntable 110, takes place. The notches 674, 676 and 678 only extend to a limited depth so that only the projection 660 is allowed to be fixed therein. The edges between the notches and the neighbouring sections 668 and 670 respectively are preferably rounded or slightly inclined.

Mechanical construction of phonograph

Below the base plate 116a, which in part is shown in most of the FIGURES 1–10, a mechanical structure in the form of two crossing rails 134a and 136a is arranged. The ends of the rail 134a are, by means of screws 138a and 140a, see FIGURE 5, connected with a frame member 142a which extends below the base plate 116a near one edge thereof. The rail 134a extends under the center of the turntable 110a; see more specifically FIGURE 10. The other end of the rail 134a is provided with a hole 146a, through which a screw, not shown, secures this end of the rail to the base plate spaced therefrom by a distance element, not shown. The rails 136a and 134a cross under the center of the turntable 110a. In FIGURE 2 a distance piece 150a is shown which spaces rail 136a from the base plate. A similar distance piece, not shown, is arranged at the other end of the rail 136a. Here a screw hole 148a is shown.

The turntable 110a is rotatably arranged on a stationary spindle 152a mounted at the point of intersection between the rails 134a and 136a and extends therethrough, secured by a nut 154a on the lower screw-threaded end portion 155a of the spindle 152a. The lower end of the spindle 152a is surrounded by a ball bearing 159a having two runs 161a and 163a. The lower run 163a rests on a felt ring 165a on the top surface of the rail 136a. The top run 165a engages another felt ring 169a, upon which a bushing 156a, connected with the turntable rests freely. The bushing 156a has radially extending flanges 160a and 162a between which a groove 168a is formed, the bottom surface of which is roughened to provide frictional engagement with a driving element for the main element of the change cycle mechanism, see more specifically FIGURE 2. This driving element is a gear wheel 164a which is freely rotatably arranged on an arm 166a by means of a pin 167a or the like. The arm 166a is provided with a keyhole-like slot 168a having a circular portion 169a which is adapted to receive a pin 170a which is secured to the underside of the base plate 116a and extends therebelow. The pin 170a has an annular groove 171a with a bottom diameter slightly less than the width of the narrow portion of the slot 168a in the arm 166a in order to allow this arm to be supported on the pin 170a, after the lower end portion of the pin is passed through the circular portion 169a, until the arm is in alignment with the annular groove, and thereby moving the arm 166a to the position shown in FIGURE 2.

The tone arm 112a is, at its rear end, swingingly arranged in a bushing 246a which is secured to and extends both above and below the base plate 116a.

The cam track which moves the slide is shown in more detail in FIGURE 8. It comprises a substantially circular portion 232a concentric with the cam disc and at such a distance from the centre thereof that when the follower 230a moves in this track portion the jib is within the periphery of a 10 inch record. Opposite this cam track portion is another, substantially circular but relatively short cam track portion 239a, corresponding to a position of the jib outside the periphery of a 12 inch record. Between these two track portions are eccentric track portions 237a and 241a respectively adapted to move the slide between the two positions mentioned above. The relation between these cam track portions and the cam track portions of FIGURE 9 will be explained in condition with the mode of operation.

*Record drop control mechanism*

The drop of the records from the center spindle is effectuated by means of the abutment 270a on the tone arm at a stage of the movements after the size of the record has been gauged. The abutment 270a is so much higher than the thickness of the jib that it extends sufficiently above the top surface thereof to engage the edge of a record, see the side view of FIGURE 10. To provide for the passage of the abutment 270a the jib is bifurcated with an inwardly extending recess 235a.

*Trip starting mechanism*

As shown in FIGURE 6, the arm 250a on which the track follower 252a is mounted forms a part of a washer with a short arm 251a that extends to form an angle with the arm 250a. Below the bore plate a pivotable lever 302a is supported on a pin 304a and has a flap 300a which extend down between the arms 251a and 252a. On the same pin 304a a further lever 306a is pivoted and extends to a point adjacent the turntable bushing 156a which is provided with a radially extending nose 308a. On each side of the levers 302a and 306a arranged washers 303a and 305a and a spring (not shown) are arranged which serves the purpose to hold the two levers in alignment and simultaneously to provide a friction action between the two levers at their common pivot point. The lever 306a is provided with an abutment 310a adapted to engage cam portion 312a (see FIGURE 2) which extends from the top side of the cam disc. Furthermore, a spring 320a is secured at one end at 321a to the lever 306a and extends along its lateral edge which is nearest to the cam 312a, with a bent portion 316a extending into a notch 314a of the cam 312a. The end of the spring is guided in holes in small brackets which extend from the lever 306a in order to allow the spring to yield, when the lever 306a is urged in the direction towards the cam surface.

In the friction link the lever 306a is also reciprocable. To this purpose, the lever 306a is provided with an elongated slot 340a through which the mounting pin 304a projects (see FIGURE 8). To keep the lever 306a in its most projecting position with its nose adjacent the nose 308a on the turntable bushing a spring 342a is provided between the two levers against the action of which the lever 306a can be pushed backwards in the longitudinal direction.

*Mode of operation*

The general mode of operation of the apparatus hereinbefore described will now be specified.

In the position of rest, the tone arm is in a position swung outside the periphery of the turntable. The ballast arm 182a is in its lifted position with the rib 199a of the disc 196a secured in the annular groove 206a of the pin 204a and also swung to its most exterior position. The switch control arm 136a is in its switch-off position. The cam disc gear wheel 164a is disengaged from the turntable spindle and is partly received in the recess in the periphery of the cam disc whereby the cam disc is positioned. The cam disc 144a is in the position where the track follower 252a on the arm 250a is in the playing recess 272a. As explained in connection with the description of the tone arm lift control cam arrangement 287a (FIGURE 9) and the diagrams of FIGURE 9a the tone arm is lowered. The slide 228a is in the position nearest the center, which means that its track follower 230a is in the cam track 232a.

With the parts in this position, one or more records to be played are placed on the central spindle. They are supported at their center holes by the supporting shoulder 191a and at their periphery by the jib 233a.

As explained with reference to FIGURE 11, the driving motor gear is designed for three different speeds, so that it will be possible to play records designed for 78, 45 or 33⅓ revolutions per minute.

The speed selector knob 664a must be set in advance for the desired speed.

The ballast arm 182a is now swung inward to radial position. This brings the recess 202a in alignment with the pin 189a, and it will simultaneously actuate the nose 208a of the switch control arm to move it to the starting position and switch on the motor. The ballast arm 182a can then be moved down to engage the top surface of the top record in the stack, and thereby stabilize the records in their horizontal position. By the movement of the switch control arm 136a, the rod 172a is simultaneously released, and, by means of the spring 173a, the rod system 172a, 166a is moved in opposite direction of the arrow C in FIGURE 2 to allow the driving gear wheel 164a to engage the bottom of the driving recess 158a as well as the periphery of the cam disc 144a.

Hereby the cam disc 144a starts to rotate. During the first part of this rotation the tone arm track follower 252a is guided through the track 274a into the feeler track 276a. As apparent from the foregoing description and the diagrams of FIGURE 9a the tone arm is raised before the follower 252a enters the track 274a. When the follower 252a passes the track 276a it is guided along the spring 284a, and if the tone arm does not meet any resistance it will be swung inward to the track 280a, which corresponds to records of the small size, i.e. 10 inch. If, however, the bottom record supported on the center spindle is a 12 inch record, the feeler abutment 270a on the tone arm will engage the edge thereof whereby the swinging of the tone arm will be interrupted. This interruption causes the follower arm to bend the spring 284a away from the entrance of the track 282a. This means that the size of the record will select the appropriate one of the two tracks further to be hereafter followed by the follower. The two tracks hereafter have similar configuration but different radii and are both merging into the playing recess 272a to guide the track follower to the playing recess. The first part of each track is substantially concentric with the cam disc. The angle which the cam disc relates during this part of the movement brings the slide follower 230a through the track 237a, so that the slide is moved away from the center. This means that the jib 233a will be moved outside the periphery of the record. When this movement of the jib is completed the pickup follower pin 252a enters the slightly inwardly directed track portion, either 258a or 287a of the selected one of the tracks which results in a slight inward movement of the tone arm, the result that the tone arm gives the lowermost record, the periphery of which is still engaged by its feeler abutment, a slight sideward movement to push it away from the supporting shoulder to allow it to slide down the pin 190a to the turntable. During this movement the slide control pin 230a moves into the circular cam track 239a. Immediately following these movements, the slide follower 230a moves in the cam track 241a to move the jib back to its position under the stack of records to support the remaining records at their edges. Simultaneously, tone arm track follower 252a continues its movement through a short cylindrical track portion in which the tone arm is not swung during the short time it takes for the record to slide down.

When the record has come down on the turntable, the track follower 252a continues in the selected one of the two inwardly leading landing track portions 187a or 189a which brings the pick-up inward to a position with its stylus above the initial groove of the ejected record. During this movement, the inclined lifting cam portion 260a also operates in engagement with the roller 258a to lower the pick-up to engage its stylus with the record. During this last movement, the track follower 252a has arrived into the playing recess 272a in which it is able to move freely so as to allow the pick-up stylus to follow the sound grooves of the record. The cam disc is stopped when the gear wheel 163a by the pull of the spring 173a and the rod 172a, is falling into the recess 322a in the periphery of the cam disc, and thereby disengaged from turntable spindle.

In this position of the parts, the record is played. During the playing, the short arm 251a engages the flap 300a of the lever 302a, thereby moves the lever system 302a, 306a in order to approach the tip of the lever 306a to the rotating nose 308a. As long as the movement only corresponds to the pitch of a normal record groove, the rotating nose 308a will not be able to grip the lever tip. When the pick-up stylus moves during its passage of the outlet groove of the record, which has a larger pitch, the arm 250a will be swung through a greater angle and the tip of the lever 308a will be engaged by the nose 308a and reciprocated. Hereby the abutment 310a on the lever 308a will engage an abutment on the cam 312a and impart an initial angular movement to the cam disc which will bring the driving gear wheel 164a out of the recess 322a to again engage the turntable spindle groove 158a. The movement takes place in the direction of the arrow shown in FIGURE 8. During this movement of the lever 306a the spring 320a is tightened, and when the rotating nose 308a releases the lever tip, the spring is released and swings the lever system away from the path of the rotating nose 308a. Simultaneously, the spring is engaged by the cam member 312a and swings the lever system away from the centre, so that the lever 306a is prevented from being engaged by the rotating nose. When the cam disc has started to rotate, the tone arm is first raised as apparent from the diagram FIGURE 9a and hereafter the track follower 252a will be engaged by the rear wall portion 271a of the playing recess 272a which will swing the tone arm outward to cause the track follower 252a to enter the track portion 274a, whereafter the movements hereinbefore described are repeated and a new record is supplied to the turntable.

When the last record of the stack has been supplied to the turntable, the ballast arm 114a moves down whereby the shoulder 181a on its spindle 180a will tilt the lever 242a downwardly with its end conditioned to engage the flap 137a on the switch control arm and when during the last cycle of movements after the playing of the last record the slide 228a moves inwardly the end of lever 242a will engage the flap 137a on the switch control arm 208a and swing the latter to the switched-off position.

*Manual rejection*

It may be convenient to provide for manual rejection to change a record. To this purpose a push-button 330a is arranged on the top surface of the base plate, see FIGURES 1 and 6. Below the base the push button is connected with a string or cord 332a guided through a hole in a bracket. The other end of the cord 332a is connected with a resilient member, such as a spring 334a, the one end of which is secured at 335a below the base plate and the free end of which is arranged to engage a downwardly extending flap 337a on the trip starter lever 306a. To prevent damage in case of wrong operation, for instance pressure of the push-button during rotation of the cam disc, the spring 334a is made weaker than the spring 320a.

In order to reject a record the pushbutton 330a is pressed. Thereby the spring 334a engages the flap 337a on the lever 306a and swings it inwardly to cause it to be engaged by the rotating nose 308a as by automatic changing after playing of a record.

Referring now to the embodiment of FIGURES 12–23, the phonograph includes as in the case of FIGURES 1–10 a base plate 116b, tone arm 112b, ballast arm 114b and turntable 110b. The driving mechanism is supposed to be as described with reference to FIGURE 11.

Also with respect to the general mechanical construction, the embodiment of FIGURES 12–23 is identical with the embodiment of FIGURES 1–10, and the corresponding parts, which will only be mentioned in connection with the description of the mode of operation, are referred to by the same reference numerals as in the embodiment of FIGURES 1–10, but with index "b." In the following therefore only the modified features will be described in more detail.

*Switch and control mechanism*

The arm 166b which supports the cam disc gear wheel 164b is kept in position to engage the periphery of the cam disc 144b by means of a reciprocable lever 172b. This lever is guided below the panel plate 116b by means of a slot 177b the left-hand edge of which at 179b, FIGURE 20, is received in a lateral recess 179b of a bushing 178b below the chassis. In normal operating position, the lever 172b is kept in substantially parallel alignment with the base plate by means of a spring 183b which is secured by rivets or the like to the underside of the base plate and engages under the edge of the lever 172b.

The connection between this lever 172b and the arm 166b is in the form of a slot-and-pin connection with a pin 185b on the arm 166b which engages a slot 187b in the lever 172b as shown in FIGURE 2.

As in the case of the embodiment of FIGURES 1–10 the ballast arm spindle disc 196b is adapted to operate the switch arm 208b. In the embodiment of FIGURES 12–23, however, the switch arm 208b is operable to reciprocate the lever 172b, by means of a pin 191b, which engages in a slot 193b. As in the case of the embodiment of FIGURES 1–10, the switch control arm 208b is also adapted to actuate the electric switch to switch on and off the motor.

Adjacent the end where the lever 172b is connected with the arm 166b, the lever 172b is provided with a sidewardly projecting portion 299b, with a downwardly extending flap 301b. The top surface of the cam disc 144b is provided with an upwardly extending abutment 310b. This abutment and the flap 301b are so dimensioned and located relatively to each other in such a manner that, as long as the parts are in rest position with the arm 172b parallel with the base plate, the cam disc abutment 310b will pass below the flap 301b.

As shown in FIGURES 14 and 20, the shoulder 181b of the ballast arm spindle 180b is adapted to engage the edge of the slot 177b opposite that edge which is supported in the recess 179b. The lever 172b will thereby, as most clearly illustrated transversely to FIGURE 20, be tilted in its longitudinal direction in order to bring the downwardly extending flap 301b into the path of the abutment 310b on the cam disc.

*Record support and record feed mechanism*

In the embodiment of FIGURES 1–10, the engagement between the feeler and ejector knob 270a on the tone arm and the lowermost record of the stack of records supported on the spindle 190a is ensured thereby that the tone arm curves inwardly in engagement with the underside of the jib 233a with the feeler knob in the slot 235a of the jib so that the knob is only allowed to engage the edge of the lowermost record. In FIGURES 12-23, the function of the jib 233a is taken over by a member mounted on the tone arm as most clearly illustrated in FIGURES 21-23.

Adjacent the free end of the tone arm an arm 350b which extends substantially radially from the tone arm in the same horizontal plane as its top surface is swingingly supported on a pivot 352b. To give the arm the necessary rigidity, a radially extending rib 354b is arranged along the bottom side of the arm. A small spring 359b, FIGURES 21 and 23, the ends of which abut against the rib 354b and the tone arm, respectively, holds the arm 350b in its rest position directed substantially radially against the center spindle 190b. On the top of the arm 350b a roller 356b which effectively provides the feeler end ejector abutment is arranged rotatably on a small pin 358b secured to the arm 350b. The center of this roller is slightly offset from the pivot 352b in such a manner that a pressure exerted against the roller in a direction substantially perpendicular to the pick-up will swing the arm 350b from its position extending from the tone arm to a position parallel therewith with the rib 354b in engagement with the edge of the tone arm. It will be understood that when this pressure is released, the spring 359b will return the arm 350b to its position extending from to the tone arm.

As will be understood from the following explanation of the mode of operation of this embodiment, the arm 350b replaces the function of the jib 233a in the embodiment of FIGURES 1-10.

*Trip starting mechanism*

This part of the mechanism is shown in exploded view in FIGURE 17 and in section in FIGURE 18a. Between the two arms 250b and 251b which are connected with the tone arm spindle a swingably supported lever 302b is arranged with a downwardly extending flap 300b adapted to be engaged by the arm 251b. The other end of the lever 302b has a disc-shaped portion 305b secured to a spindle 307b, which is supported to hang rotatably in a bushing 309b which is secured to the underside of the base plate 116b. The bushing has a recess 311b which extends into the bushing and communicates with the central bore in which the spindle is allowed to rotate. In order to suspend the spindle in the bushing, the spindle is provided with an annular groove at 313b adapted to be engaged by one end of a spring 315b, which is held on the bushing, with one end received in the recess 311b to engage the annular groove 313b. It will be understood that the spindle 307b is freely suspended in the bushing, thus allowing the lever 302b to swing with very little friction. Below the disc-shaped portion 305b a further disc 315b is secured on the spindle 307b, spaced from the disc 305b at a distance slightly greater than the thickness of the lever 306b, which is of the same construction as shown in FIGURE 8, with the difference only that the friction link shown in FIGURE 8 between the levers 302a and 306a in FIGURES 17 and 18—18a is substituted by the arrangement most clearly shown in FIGURE 18a. The friction between the levers 302b and 306b is obtained by means of the weight of the lever 306b due to the fact that it is freely pivotable about the spindle 307b with a small vertical play in the gap between the discs 305b and 315b. The lever 306b has a longitudinal slot 209b. Furthermore the lever 306b has an extending portion 211b, FIGURE 17, the end of which has a downwardly extending flap 313b. Between the end of this flap and the spindle 307b a relatively weak pressure spring 317b is arranged, which in the normal position of the parts will keep the tip of the lever 306b adjacent the path of the rotating nose 308b. The function of the spring 317b thus is the same as that of the spring 342a in the embodiment of FIGURE 8. Also as in FIGURE 8 an abutment 310b on the lever 306b is adapted to cooperate with a cam portion 312b to start the cam disc in response to actuation of the trip starter and a spring 320b is provided to move the lever 306b away from the nose 308b after the operation of the mechanism.

*Pick-up moving mechanism*

The mechanism which controls the vertical movement of the tone arm is similar to that of FIGURES 5 and 7 and will therefore not be described here.

The mechanism which controls the horizontal swinging of the tone arm is based on the same principle as that of FIGURES 1-10, but differs from FIGURE 9 by being provided with three parallel cam tracks which follow the cam portion 276b which provides the feeler track.

The different portions of the three cam tracks correspond to the different portions of the two cam tracks of FIGURE 9 and are in FIGURE 19 designated by corresponding reference numerals, but with index 1, 2 and 3.

A spring 284b which corresponds to the spring 284a in FIGURE 9 is located to close the entrance of the two outer cam tracks.

The swingably arranged record support arm 350b which extends from the pick-up arm is so long that it can also support a 7 inch record at its edge.

It will be understood from FIGURE 19 and the diagram of FIGURE 19a, with reference to the explanation given in connection with FIGURES 9 and 9a, that if the tone arm moves inwardly without meeting any resistance, the spring 284b will guide the track follower 252b on the lever 250b into the interior cam track $283^3$. If, however, the feeler abutment abuts against the edge of a 10 inch record, the spring 284b will yield and guide the track follower 252b into the intermediate cam track $282^2$. If the feeler abutment engages the edge of a 12 inch record, the spring 284b will yield and allow the track follower 152b to be guided into the exterior cam track $282^1$.

*Mode of operation*

In the rest position the various parts are in the same relative positions as described with reference to FIGURES 1-10. The cam disc gear wheel 164b is disengaged from the driving recess turntable spindle, because the switch-off lever 208b is in the switch-off position and has moved the lever 172b in the direction of the arrow in FIGURE 13. Starting of the mechanism is effected as explained before by swinging the ballast arm 114b inwardly to radial position; this swings the switch lever 208b to close the switch and simultaneously reciprocates the lever 172b in opposite direction of the arrow A to bring the gear wheel 164b into driving engagement between the turntable spindle and the cam disc.

During the first part of the movement of the cam disc, the tone arm is raised and the track follower 252b is guided into the cam portion 274b. The track follower then moves into the feeler track 276b along the spring 284b until the feeler knob on the tone arm engages the edge of a record. If the lowermost record is a 12 inch record, the spring will yield before the track follower 252b has passed the entrance to the exterior cam track to allow the track follower to enter this track. If the lowermost record is a 10 inch record, the track follower on the arm 250b will follow the spring 284b substantially to the point marked X in FIGURE 19. Then the spring 284b will yield and allow the track follower 252b to enter the intermediate cam track. If the lowermost record is a 7 inch record, the feeler abutment on the tone arm will not meet any resistance and will be guided the whole way through the feeler track along the spring 284b so as to enter the interior cam track.

When the track follower pin has entered that cam track which corresponds to the size of the lowermost record gauged by means of the feeler knob, the further movements of the tone arm as controlled by the selected cam track are, as explained with reference to FIGURE 9, a slight inward movement with the feeler knob 356b in engagement with the edge of the lowermost record, to push the record laterally to release it from the supporting shoulder 191b of the center spindle along which it descends to the turntable followed by an inward swinging to the start-of-play position and lowering on the record.

When the abutment 356b on the tone arm engages the edge of the lowermost record, the inwardly extending arm 350b is swung to the position most clearly shown in FIGURE 23, because its pivot is slightly offset from the abutment which engages the record edge. Thereby the arm 350b is moved to the position where it will not obstruct the passage of the record to the turntable, which even may be facilitated by an inclined edge 325b of this arm.

The tone arm is then moved inwardly to the playing position and lowered upon the record to engage its stylus with its initial sound groove. As in FIGURES 1–10, the cam disc is stopped when the gear wheel 164b falls into a recess of the cam disc.

During the playing the short arm 251b which is connected is with the tone arm spindle will swing the trip starter levers 302b and 306b slightly in accordance with the pitch of the sound-groove. As in the case of FIGURE 8, the rotating nose 308b will swing the lever 306b back during each rotation of the turntable. This movement is not transmitted back to the lever 302b due to the fact that the lever 306b is swinging freely on the spindle 307b in the gap between the two discs 305b and 315b, only with the friction caused by its own weight. When the pick-up stylus is moved in the outlet groove of the record, the increased angular movement of the two levers 302b and 306b will bring the tip of the lever 306b into engagement with the rotating nose 308b, and thereby move the lever 306b to start a similar cam disc in the same manner as described with reference to FIGURE 8.

When the last record has been played, the ballast arm spindle 180b descends and the engagement between its shoulder 181b' and the lever 172b causes the lever to tilt as shown in FIGURE 20. This conditions the mechanism for automatic step by bringing the downwardly directed flap 301b on the lever 172b into the path of the abutment 310b on the cam disc so that when the cam disc is started the abutment 310b, will push the lever 172b in the direction of the arrow A, and thereby actuate the switch arm as well as disengage the gear wheel.

Also in the embodiment of FIGURES 13–23 manual switch control may be applied in a similar manner as described with reference to FIGURE 6.

A third embodiment of the automatic phonograph will now be explained with reference to FIGURES 24–35.

The common features of this third enmbodiment and the previously described embodiments will not be described here. Similar parts are designated by similar reference numerals with index "c."

*Tone arm control mechanism*

The cam disc which is illustrated in plan view in FIGURE 31, within FIGURE 31a diagrammatically showing the horizontal and vertical movements of the tone arm, is provided with a playing recess 272c, in which the track follower 252c can move freely during the playing of a record. The corresponding cam which controls the vertical pick-up arm movement is a portion 261c corresponding to lowered tone arm. Hereafter follows the different cam portions in sequence: A vertical control portion 263c corresponding to raising of the pick-up arm, an outwardly guiding feeler track portion 276c for moving the tone arm to its outer position with the tone arm raised. The feeler track 276c comprises two spring members 184c and 154c secured to the cam disc in a manner similar to the spring member 284a (FIGURE 9), and adapted to close the entrance to two cam tracks of a group of cam tracks for controlling inward and outward swinging of the tone arm comprising an interior track 282c³ an intermediate track 282c² and an exterior track 282c¹.

Each of the three cam tracks has a portion 282c¹, 282c², and 282c³ which provides an outward movement of the tone arm to bring its ejector abutment outside the edge of the record followed by inwardly leading portions to control the ejection or side push of the record. The last portions of the group of tracks are the landing portions which causes the tone arm to be swung inwardly to the start-of-play position. Between the raised cam surface portion 266c and the portion 261c a sloping portion 267c is provided corresponding to lowering the pick-up.

On the pick-up arm, as most clearly illustrated in FIGURES 33, 34 and 35, a small wheel or roller 400c is arranged which is allowed to rotate freely on a pin 402c and effectively provides a light friction member. The roller extends above the top surface of a small knob 404c, which is provided with a high friction surface, for example, a rubber pad 403c which is arranged in trailing disposition relatively to the roller 400c as most clearly shown in FIGURES 34 and 35, with the knob nearer the centre of the turntable than the roller. The high friction member effectively provides the record size feeler while the knob 404c effectively provides the ejector abutment.

*Mode of operation*

When the parts are in rest position, the pick-up control pin 252c lies in the end of the cam portion 272c near the portion 176c corresponding to the inner position of the pick-up which is raised with the lever wheel engaging the cam surface 263c. When the mechanism is started, the cam disc rotates in the direction of the arrow shown in FIGURE 31. The pick-up is first swung outwards and simultaneously by means of the cam portion 266c raised slightly to engage the light friction roller 400c against the underside of the lowermost record in the magazine. The horizontal movements are hereafter as follows: The track follower pin follows the feeler track portion 276c, and the springs 154c¹ and 184c¹. If the lowermost record is a 12 inch record, the light friction roller 400c runs with very low friction along the underside of the record with the result that the track follower 252c is guided along the two springs into the entrance of the exterior cam track 282c¹. If the lowermost record is a 10 inch record, the roller 400c will pass the edge of the record during its outward travel which will bring the trailing high friction member 403c into engagement with the record surface adjacent the edge. At that stage the follower 252c has started to slide along the spring 184c. The tension of this spring is so adapted to the friction between the knob 403c and the record surface that this friction will overcome the spring tension, and cause the spring to yield so as to open the entrance of the intermediate cam track 282c².

In a similar manner the passage of the roller 400c beyond the edge of a 7 inch record will cause the spring 154c to yield, and open the entrance to the interior cam track 282c³.

It will be understood, that, in the manner here described, the track follower 252c will automatically be guided into the appropriate one of the three cam tracks which correspond to the three different sizes of record to be played. When the track follower has entered the correct cam track, the tone arm will be moved slightly outwards by means of the track portion 282c¹, 282c² or 282c³, to bring the ejector knob outside the record edge and then inwards to engage the knob 404c with the edge of the record and push it from the supporting shoulder on the center spindle. During the drop of the record a slight outward movement may be imparted to the tone arm, whereafter it will be moved inwards and lowered to engege its stylus with the top surface of the record supplied to the turntable.

The remaining part of the operation of this embodiment corresponds to that described with reference to FIGURES 12–23.

It will be understood that the invention, which in the foregoing has now been described in great detail with reference to three different embodiments, is not limited to the specific constructions shown and described with reference to the accompanying drawings.

One important feature of my invention is that the tone arm is controlled to travel from an end-of-play position to a start-of-play position through a path in which a feeler member on the tone arm gauges the size of the next record to be played, and that by this feeling the remaining travel of the tone arm is selectively determined in accordance with the size of the record to be played so as to land the tone arm on the record in correct start-of-play position.

Another important feature of my invention is that the tone arm after the feeling of the size of the record is moved to utilize its feeler abutment or a member associated with the feeler member to eject the record to be supplied.

Especially the feeler scheme provides for a simplification of the mechanism and reduces the number of levers and movable parts which are necessary. My new phonograph is capable of playing records a plurality of different sizes in intermixed relationship without any complicated feeler arrangement incorporated and operable to control operable to control the pick-up travel in accordance with the size of records.

In my construction I obtain a very substantial simplification by means of the features described. By selecting the path of the tone arm to let abutment on the tone arm gauge the record size before the record is released I have been able to avoid a considerable amount of moving parts substantially beyond what could be expected merely by throwing out the separate record feeler.

As mentioned in connection with this embodiment the position of rest of the cam disc 144c corresponds to the pick-up in raised position, but near the centre, viz. with the cam track follower 156c in the broad cam track 172c.

In the embodiment of FIGS. 24–35, the cam disc may, as indicated in dotted lines in FIGURE 31, be provided with a further cam track portion comprising an outwardly loading portion 173c moving the tone arm outside the periphery, where the track follower will be in a cam track portion 174c, which then corresponds to the position of rest after playing of the last record, as in the case of the two other embodiments. This means that the cam surface which controls the vertical movement must have a portion 261c raising the pick-up and a portion 263c corresponding to raised pick-up in the outer position thereof. When in this case the phonograph is started, the tone arm is first slightly lowered by means of the cam portion 264c and simultaneously moved inwardly by means of the cam track 175c, then the tone arm is again raised by means of the cam portion 265c, whereafter the cycles of movements will be following the cam portion 276c and further as previously described.

I claim:

1. In a record changing apparatus of the kind wherein records, which may be of differing sizes, are supported in a stack and are transferred one by one from the bottom of the stack to a turn-table whereon they are accumulated in a pile and wherein the top side of the exposed record on the turn-table is played by a record-playing member arranged at a tone arm structure and having a start-of-play position dependent upon the size of the record to be played, the combination with the turn-table and the playing member, of a support for the stack of records, means for mounting said tone arm structure in said apparatus to enable swinging movement about an axis, control means including cam means and elongated cam engaging means operatively connected with said tone arm structure to swing in unison therewith about said axis of the tone arm structure, said control means being operative to swing said playing member to thereby effectively feel the edge of the bottom record to be played next for testing the size of the bottom record of the stack and to engage the edge of the bottom record for pushing it off the support to procure its release from the stack, and guiding means for guiding the released bottom record to the turn-table for subsequent playing by the playing member, said control means including means effectively constituted by said cam means and said cam engaging means and responsive to the size test to guide the playing member to a start-of-play position appropriate to the record size.

2. In a record changing apparatus of the kind wherein records, which may be of differing sizes, are supported in a stack and are released one by one from the bottom of the stack to a turn-table whereon they are accumulated in a pile and wherein the top side of the exposed record on the turn-table is played by means of a tone arm provided with a tone arm spindle structure adapted to swing about an axis of rotation and having a start-of-play position dependent upon the size of record to be played, the combination of a fixed support for supporting the stack of records vertically spaced above the turn-table and for releasing the lowermost record upon edge-wise movement of said record, a rotatable cam member operable for moving the tone arm from an end-of-play position to a start-of-play position, driving means actuable for rotating the cam member between each playing of a record, restraining means operable for limiting each such rotation to a predetermined angle, and starting means actuable for initiating rotation of the cam member on termination of the playing of a record, a cam engaging member extending approximately radially outwardly from said tone arm spindle structure and operatively connected therewith for swinging in unison therewith about said axis, said cam member having first means operative during such rotation and upon engagement therewith by said cam engaging member for moving the tone arm to feel the edge of the lowermost record in the stack for testing the size of said lowermost record and for selecting responsive to said testing a path of movement of the tone arm to a start-of-play position appropriate to the size of record tested, and second means on said cam member for moving the tone arm to impart edgewise movement to said lowermost record pushing it off the support to procure release of the latter from the stack and finally moving the tone arm to the appropriate start-of-play position.

3. In a record changing apparatus of the kind wherein records, which may be of differing sizes, are supported in a stack and are released one by one from the bottom of the stack to a turn-table whereon they are accumulated in a pile and wherein the top side of the exposed record on the turn-table is played by means of a pick-up arm having a start-of-play position dependent on the size of said exposed record to be played, the combination, with the turn-table and a tone arm assembly having a spindle structure adapted to swing about an axis of rotation and said pick-up-arm, of a support for the stack of records releasing the bottom record of the stack upon displacement of the latter in its own plane, a cycle control mechanism for moving the pick-up arm from an end-of-play position after playing a record to a start-of-play position appropriate to the size of the next record to be played which cycle control mechanism includes cam means and cam engaging means operatively connected with said tone arm spindle structure for rotation in unison therewith about said axis and operative upon engagement with said cam means for moving the pick-up arm to engage the edge of the bottom record of the stack and to move the latter substantially in its own plane to procure its release from the stack to the turn-table before movement of the pick-up arm to the start-of-play position for that record, and means in said cycle control mechanism including said cam means and said cam engaging means and responsive to engagement of the pick-up arm with the edge of the bottom record to determine and effectively guide said pick-up arm to the start-of-play position appropriate to the size of said record.

4. In an automatic phonograph apparatus for playing a succession of records of differing sizes, of the kind wherein the records are supported in a stationary stack and are released one by one from the bottom of the stack to a turn-table whereon they are accumulated in a pile and whereby the top side of the exposed record on the turn-table is played by means of a pick-up arm having a start-of-play position dependent on the size of the exposed record to be played, the combination with the turn-table and pick-up arm, of a support pin extending above the turn-table and having a shoulder spaced from the turn-table for supporting the stack of records and for releasing the bottom record of the stack for subsequent descent to the turn-table on bodily movement of that record in its own plane, a tone arm spindle structure adapted to swing about an axis of rotation, control means operable for moving the pick-up arm to engage the edge of said bottom record and to push it to effect bodily movement thereof, said control means including rotary cam means and cam engaging means operatively connected with said tone arm spindle structure for swinging together therewith about said axis, and means including said cam means and said cam engaging means and responsive to said edge-engagement to guide the pick-up arm, subsequent to the receipt of that record on the turn-table, to a start-of-play position dependent on the size of that record.

5. In an automatic phonograph apparatus for playing a succession of records of differing sizes, of the kind wherein a series of records to be played is stacked in the phonograph, and records are delivered one by one from the stack onto a horizontal turn-table whereon they are accumulated in a pile and wherein the top side of the exposed record is played by means of a tone arm supported by a swingable tone arm spindle structure and having a start-of-play position dependent on the size of said exposed record, the combination of means for swingingly mounting said tone arm spindle structure to swing about an axis, of control means operable for stabilizing each record prior to delivery to the turn-table in a horizontal position above the turn-table, and a cycle control mechanism including cam means and cam engaging means operatively connected near one end thereof to said spindle structure for swinging together therewith about said axis and provided near the other end thereof with cam follower means adapted to engage with said cam means to produce swinging control movements of said tone arm, first means in said cam means and including said tone arm to effectively move said tone arm to feel the edge of the lowermost stacked record for testing the size thereof, said cam means including second means for effectively pushing said lowermost record off its support in the stack by said tone arm to effect delivery of the tested record to the turn-table ready for playing, and third means responsive to said test for moving the tone arm, after the record has been received on the turn-table, to a start-of-play position appropriate to the size of the tested record.

6. In an automatic phonograph apparatus for playing a plurality of records of differing sizes one after another, the combination of a support for the record to be played, means positioning the next succeeding record spaced from said support, a record-playing member for playing each record in turn, means for moving the playing member in a path from an end-of-play position after playing a record to a start-of-play position for playing the next record, said path including a part taking the playing member outwards past the edge of the next record and the start-of-play position being dependent on the size of said next record, record-edge detecting means disposed on the playing member and comprising a low friction member engaging the surface of the next record until carried past the edge of that record in outward movement of the playing member, and a high friction member then engaging the surface of said record imposing a drag on any continued outward movement of the playing member, and means responsive to said frictional drag for determining the start-of-play position in accordance with the size of said next record.

7. In a record changing apparatus of the kind wherein records, which may be of differing sizes, are supported in a stack and are transferred one by one from the bottom of the stack to a turn-table whereon they are accumulated in a pile and wherein the top side of the exposed record on the turn-table is played by a record-playing member having a start-of-play position dependent upon the size of the record to be played, the combination with the turn-table and the playing member, of a stationary support for the stack of records, a tone arm spindle structure for supporting thereon said playing member and adapted to swing about an axis of rotation, control means effectively guiding the playing member to feel the edge for testing the size of the bottom record of the stack including rotatable cam means and an elongated member operatively connected with said tone arm spindle structure for swinging therewith about said axis and provided remote from said spindle structure with a cam follower member for engaging with said cam means, means operable to transfer the tested record from the support to procure its release from the stack, and guiding means for guiding the released tested record to the turn-table for subsequent playing by the playing member, and cam means including means operative upon engagement with said cam follower member and responsive to the size test to effectively guide the playing member to a start-of-play position appropriate to the record size.

8. In a record changing apparatus of the kind wherein records, which may be of differing sizes, are supported in a stack and are released one by one from the bottom of the stack to a turn-table whereon they are accumulated in a pile and wherein the top side of the exposed record on the turn-table is played by means of a pick-up arm having a start-of-play position dependent on the size of said exposed record to be played, the combination, with the turn-table and the pick-up arm, of a stationary support for the stack of records, means for releasing the bottom record of the stack, a tone arm spindle structure for supporting thereon said pick-up arm, said tone arm spindle structure being swingable about an axis of rotation and including an elongated cam follower member mounted thereon for swinging therewith about said axis of rotation, and control means including cam means with which said elongated cam member is operatively associated for moving the pick-up arm from an end-of-play position after playing a record to a start-of-play position appropriate to the size of the next record to be played, which cam means includes first means for effectively moving the pick-up arm to engage the edge of the bottom record of the stack to test the size thereof, said control means including further means operable to procure the release of said tested record from the stack to the turn-table before movement of the pick-up arm to the start-of-play position for that record, and means effectively constituted at least in part by the cooperation between said cam means and said cam follower member and responsive to engagement of the pick-up arm with the edge of the bottom record for determining the start-of-play position appropriate to the size of said record.

9. In an automatic phonograph for playing a plurality of records, in combination: record-playing means having supporting means and frictional means, tone arm spindle means for supporting said record-playing means so as to be swingable about an axis, control means for controlling the travel of said record-playing means from the end-of-play position of the previously-played record to the start-of-play position of the next record to be played through a path in which said supporting means engages the surface of the next record to be played and said frictional means engages the surface of the next record to be played after said supporting means passes beyond the edge of the record, said frictional means opposing the travel of said playing means adjacent the periphery of said record upon engagement of said frictional means with the record surface, said control means including an arm structure, means operatively connecting said arm structure with said spindle means to provide swinging movements of said arm structure together with said tone arm spindle means about said axis, rotatable means engageable with the free end of said arm structure for imparting predetermined swinging movements to said record-playing means about said axis, and means in said control means and operative in response to the opposition produced by engagement of said frictional means with the record surface for selecting the further travel path of said record-playing means to correspond to the size of the last-mentioned record.

10. A record-changing phonograph in which the size of the next record to be played is gauged by means of an abutment on the tone arm, comprising a turn-table for supporting thereon the record to be played, a stationary spindle projecting upwardly from said turn-table for centering the record to be played with respect to said turn-table and including means for supporting thereon at least one record to be played in spaced relationship to said turn-table, a tone arm, a tone arm spindle structure for supporting thereon said tone-arm to swing about an axis of rotation, and means including rotatable cam means and an elongated cam engaging member forming effectively a unitary structure with said tone arm spindle structure for swinging movement in unison therewith for moving said tone arm against the record to be played next to gauge the size thereof by said abutment means while said next record is supported by said first-mentioned means on said spindle in spaced relationship with said turn-table.

11. A record-changing phonograph in which the size of the next record to be played is gauged by means of an abutment on the tone arm, comprising a turn-table for supporting thereon the record to be played, a stationary spindle projecting upwardly from said turn-table for centering the record to be played with respect to said turn-table and including means for supporting thereon at least one record to be played in spaced relationship to said turn-table, a tone arm, a tone arm spindle structure for supporting thereon said tone arm and adapted to swing about an axis of rotation, means including rotatable cam means and an elongated member operatively associated with said cam means for moving said tone arm against the record to be played next to gauge the size thereof by said abutment means while said next record is supported by said first-mentioned means on said spindle in spaced relationship with said turn-table, said elongated member being operatively connected near one end thereof with said tone arm spindle structure to swing about said axis in unison therewith and being provided near the other end thereof with a cam follower member adapted to engage with said cam means, means operable after said gauging to relieve said record from said support means to descend to said turn-table, and means in said cam means operable thereafter to move said tone arm to the start-of-play position thereof on said record supported on said turn-table.

12. A record-changing phonograph in which the size of the next record to be played is gauged by means of an abutment on the tone arm, comprising a turn-table for supporting thereon the record to be played, means for supporting at least one record to be played, a tone arm with abutment means, a tone arm spindle structure for supporting thereon the tone arm to enable swinging movements thereof about an axis of rotation, a cam follower structure mounted on said tone arm spindle structure to provide swinging movements of said cam follower structure together with said tone arm spindle structure about said axis, and means including cam means operable to engage with said cam follower structure for imparting swinging movements to said cam follower structure about said axis of rotation and therewith for moving said tone arm against the record to be played next to gauge the size thereof by said abutment means while said next record is supported by said first-mentioned means on said spindle in spaced relationship with said turn-table including means responsive to said gauging operation to index the starting position of said tone arm with respect to said spindle.

13. A record-changing phonograph in which the size of the next record to be played is gauged by the swinging movement of the tone arm while said record is supported in spaced relationship from the turn-table, comprising a turn-table provided with a spindle for supporting thereon the record to be played, means for supporting said record in spaced relationship with respect to said turn-table including release means to release said record from said spaced position onto said turntable, abutment means on said tone arm for engagement with the peripheral portion of said record while supported by said support means in spaced relationship to said turn-table to provide a restraint to further swinging movement of the tone arm, a tone arm spindle structure for said tone arm and mounted in said phonograph for swinging movements about an axis of rotation, and control means operatively connected with said tone arm including rotatable cam means and elongated cam follower means mounted on said tone arm spindle structure for swinging in unison therewith about said axis to control the swinging movements thereof as well as the vertical position thereof relative to said turn-table including means for providing a plurality of start-of-play positions for the tone arm and means operatively connected with said last-mentioned means and responsive to said restraint against further swinging movement of the tone arm caused by engagement of said abutment means with said peripheral portion to select the proper start-of-play position for said tone arm which corresponds to the size of said record.

14. A record-changing phonograph having a tone arm including a record size feeling abutment and a tone arm spindle structure adapted to swing about an axis, a turn-table for supporting records during playing thereof and a stationary spindle extending above the turn-table and having means for supporting records in a stack, and a control mechanism for moving the tone arm to a start-of-play position including means for raising and lowering the tone arm, and means for swinging the tone arm provided with means for governing the swinging movement of the tone arm by the size of the next record to be played, said means for swinging the tone arm including a rotatable member provided with cam means and an elongated member mounted on said spindle structure for swinging together therewith about said axis, said means for lowering and raising the tone arm being timed with said means for swinging the tone arm to move the tone arm to engage its feeler abutment against the edge of the lowest record on said center spindle, means for supplying the records from said stationary spindle to its playing position on the turntable after such engagement, and means including said cam means operable in response to said engagement to cause the tone arm to be landed in the start-of-play position on said record after it has been supplied to the turn-table.

15. In a record-changing phonograph having means for gauging the size of the next record to be played in the form of an abutment on the tone arm and control means operable to land the tone arm to engage its stylus in the initial sound groove of the record in the start-of-play position governed by the engagement of the tone arm feeler abutment in the edge orbit of a record, the combination with the tone arm of a turn-table for supporting the record to be played, a stationary spindle projecting upwardly from said turn-table and having means for supporting a stack of records vertically spaced from said turn-table, means operable to release the records in sequence to descend to the turntable, and control means for moving the tone arm in timely related vertical and horizontal directions through a cycle of movements causing engagement between said feeler abutment and the record while the record is supported on said stationary spindle and then, after operation of said release means for the record to cause it to descend to the turn-table, to land the tone arm in the start-of-play position thereof on the record resting on the turn-table, said control means including a rotatable member having surface portions, a tone arm spindle structure supporting thereon said tone arm for swinging movements about an axis of rotation, a cam follower structure mounted on said tone arm spindle structure for swinging movements together with said tone arm spindle structure about said axis of rotation, and means for selectively producing a direct engagement between said cam follower structure and the surface portions on said rotatable member to thereby provide for the control of the swinging movements and correct start-of-play position of said tone arm during the control cycle.

16. A record-changing phonograph comprising a turntable, a stationary center spindle operable to support a stack of records, means for sequentially releasing the records from said center spindle to said turn-table, a tone arm including stylus means for playing records when supported on said turn-table, and control means operable to move said tone arm through a cycle between each playing of a record including landing the tone arm in the start-of-play position thereof on the next record to be played when said record has been released to the turn-table, abutment fast with said tone arm, a swingable tone arm spindle structure for supporting thereon said tone arm to enable swinging movements about the swinging axis thereof, an elongated member mounted on said tone arm spindle structure for swinging together therewith about said axis, rotatable means provided with surface portions with which said elongated member is operable to engage within an area thereof remote from said tone arm spindle structure, said surface portions effectively providing for travel of said elongated member, when in engagement with the surface portions, along paths at different radial distances from the axis of rotation of said rotatable means and corresponding to records of different sizes, and said control means including means for timing the movements of said tone arm so as to move the tone arm to engage said abutment thereof with the edge of the next record to be released from said center spindle to gauge the size of said record, means operable to release said record to the turntable after the gauging thereof, and means operable for eventually landing said tone arm in said start-of-play position on said recod.

17. In a record-changing phonograph having a turntable, a stationary center spindle operable to support a stack of records, means for sequentially releasing the records from said center spindle to said turn-table, a tone arm including stylus means for playing records when supported on said turn-table, and control means operable to move said tone arm through a cycle between each playing of a record including landing the tone arm in the start-of-play position thereof on the next record to be played, an abutment fast with said tone arm, a swingable tone arm spindle structure for supporting thereon said tone arm and swingable about an axis of rotation, a follower structure operatively connected with said tone arm spindle structure to swing together therewith about said axis and extending outwardly therefrom, rotatable means provided with surface portions operable to engage and effectively guide said follower structure, said rotatable means being included in said control means and being operable during engagement with said follower structure for moving the tone arm to engage said abutment thereof with the edge of the next record to be released from said center spindle to gauge the size of said record, means operable to release said record to the turn-table after the gauging thereof, and further cam means included in said control means and operatively associated with said cam engaging means for landing said tone arm in said start-of-play position on said record.

18. In a record changing phonograph of the kind having a turntable for supporting thereon a record to be played, support means for supporting at least one further record to be played next in spaced relationship from said support means, and a swingable tone arm structure for playing the record supported on said turntable including a tone arm supported by a tone arm spindle structure adapted to swing about an axis, the improvement essentially consisting of a cycle control mechanism for gauging the size of the next record to be played while supported on said support means in spaced relationship to said turntable and for determining the correct start-of-play position of said tone arm by said gauging operation, comprising abutment feeler means on said tone arm, control means including a rotatable member having cam means, and cam follower means including an elongated member operatively connected near one end thereof with said spindle structure for swinging movements substantially in unison therewith about said axis and provided near the other end thereof remote from said spindle structure with cam engaging means to engage with the cam means of said rotatable member, said cam means being provided with first means operable to effectively move the abutment feeler means on said tone arm structure into engagement with the edge of the next record to be played while supported on said support means, further means in said control means for releasing said last-mentioned record to said turntable upon completion of said gauging operation, said cam means being provided with second means for effectively landing said tone arm structure in the correct start-of-play position corresponding to the diameter of the said last-mentioned record in response to said gauging operation by the abutment feeler means on said tone arm structure, and still further means in said control means for effectively disengaging the cam engaging means of said cam follower means from said rotatable member to enable unobstructed swinging movements of the elongated member of said cam follower means together with said tone arm spindle structure during playing of a record.

19. In a record changing phonograph of the kind having a turntable for supporting thereon a record to be played, support means for supporting at least one further record to be played next in spaced relationship from said support means, and a swingable tone arm structure for playing the record supported on said turntable including a tone arm supported by a tone arm spindle structure adapted to swing about an axis, the improvement essentially consisting of a cycle control mechanism for gauging the size of the next record to be played while supported on said support means in spaced relationship to said turntable and for determining the correct start-of-play position of said tone arm by said gauging operation, comprising control means including cam means, cam follower means operatively connected near one end thereof with said spindle structure for swinging movements substantially in unison therewith about said axis and provided near the other end thereof remote from said spindle structure with cam engaging means to engage with the said cam means, said cam means being provided with first means operable to effectively move said tone arm into engagement with the next record to be played while supported on said support means to produce said gauging operation, said cam means being provided with second means for effectively landing said tone arm structure in the correct start-of-play position corresponding to the diameter of the said last-mentioned record in response to said gauging operation by said tone arm, and still further means in said control means for effectively disengaging the cam engaging means of said cam follower means from said cam means to enable unobstructed swinging movements of said cam follower means together with said tone arm spindle structure during playing of a record.

20. In a record changing phonograph of the kind having a turntable for supporting thereon a record to be played, support means for supporting at least one further record to be played next in spaced relationship from said support means, and a swingable tone arm structure for playing the record supported on said turntable including a tone arm supported by a tone arm spindle structure adapted to swing about an axis, the improvement essentially consisting of a cycle control mechanism for gauging the size of the next record to be played while supported on said support means in spaced relationship to said turntable and for determining the correct start-of-play position of said tone arm by said gauging operation, comprising abutment feeler means on said tone arm, control means including a rotatable member having cam means, cam follower means including an elongated member operatively connected near one end thereof with said spindle structure for swinging movements substantially in unison therewith about said axis and provided near the other end thereof remote from said spindle structure with cam engaging means to engage with the said cam means of said rotatable member, said cam means being provided with first means operable to effectively move the abutment feeler means on said tone arm into engagement with the next record to be played while supported on said support means to produce said gauging operation, said cam means being provided with second means for effectively landing said tone arm structure in the correct start-of-play position corresponding to the diameter of the said last-mentioned record in response to said gauging operation by the abutment feeler means on said tone arm, and still further means in said control means for effectively disengaging the cam engaging means of said cam follower means from said cam means on said rotatable member to enable unobstructed swinging movements of the elongated member of said cam follower means together with said tone arm spindle structure during playing of a record.

21. In a record changing phonograph of the kind having a turntable for supporting thereon a record to be played, support means for supporting at least one further record to be played next in spaced relationship from said support means, and a swingable tone arm structure for playing the record supported on said turntable and having a tone arm spindle structure adapted to swing about an axis, the improvement essentially consisting of a cycle control mechanism for gauging the size of the next record to be played while supported on said support means in spaced relationship to said turntable and for determining the correct start-of-play position of said tone arm structure by said gauging operation, comprising abutment feeler means on said tone arm structure and control means for realizing said gauging and start-of-play determining operations including a rotatable member having cam means, cam follower means forming part of said spindle structure for swinging substantially in unison therewith about said axis and provided remote from said spindle structure with cam engaging means to engage with the cam means of said rotatable member, said cam means having means operable to effectively provide a plurality of travel paths for said cam engaging means at different radial distances with respect to the axis of rotation of said rotatable member and corresponding to records of different sizes engaged by said abutment feeler means.

22. In a record changing phonograph of the kind having a turntable for supporting thereon a record to be played, support means for supporting at least one further record to be played next in spaced relationship from said support means, and a swingable tone arm structure for playing the record supported on said turntable and having a tone arm spindle structure adapted to swing about an axis, the improvement essentially consisting of a cycle control mechanism for gauging the size of the next record to be played while supported on said support means in spaced relationship to said turntable and for determining the correct start-of-play position of said tone arm structure by said gauging operation, comprising abutment feeler means on said tone arm structure and control means for realizing said gauging and start-of-play determining operations including a rotatable member having cam means, cam follower means forming part of said spindle structure for swinging substantially in unison therewith about said axis and provided remote from said spindle structure with cam engaging means to engage with the cam means of said rotatable member, said cam means having means operable to effectively provide a plurality of travel paths for said cam engaging means at different radial distances with respect to the axis of rotation of said rotatable member and corresponding to records of different sizes engaged by said abutment feeler means, and means in said control means for effectively disengaging said cam engaging means from said rotatable member to enable unobstructed swinging movements of said cam follower means together with said tone arm spindle structure during playing of a record.

23. In a record changing phonograph of the kind having a turntable for supporting thereon a record to be played, support means for supporting at least one further record to be played next in spaced relationship from said support means, and a swingable tone arm structure for playing the record supported on said turntable and having a tone arm spindle structure adapted to swing about an axis, the improvement essentially consisting of a cycle control mechanism for gauging the size of the next record to be played while supported on said support means in spaced relationship to said turntable and for determining the correct start-of-play position of said tone arm structure by said gauging operation, comprising abutment feeler means on said tone arm structure, and control means for realizing said gauging and start-of-play determining operations including a rotatable member having cam means and an elongated member mounted on said spindle structure for swinging substantially in unison therewith about said axis, cam engaging means on said elongated member remote from said tone arm spindle structure to engage with the cam means of said rotatable member, said cam means being provided with means effectively providing for travel of said cam engaging means at different radial distances with respect to the axis of rotation of said rotatable member corresponding to records of different sizes.

24. In a record changing phonograph of the kind having a turntable for supporting thereon a record to be played, support means for supporting at least one further record to be played next in spaced relationship from said support means, and a swingable tone arm structure for playing the record supported on said turntable and having a tone arm spindle structure adapted to swing about an axis, the improvement essentially consisting of a cycle control mechanism for gauging the size of the next record to be played while supported on said support means in spaced relationship to said turntable and for determining the correct start-of-play position of said tone arm structure by said gauging operation, comprising abutment feeler means on said tone arm structure, and control means for realizing said gauging and start-of-play determining operations including a rotatable member having cam means and an elongated member mounted on said spindle structure for swinging substantially in unison therewith about said axis, cam engaging means on said elongated member remote from said tone arm spindle structure to engage with the cam means of said rotatable member, said cam means being provided with means effectively providing for travel of said cam engaging means at different radial distances with respect to the axis of rotation of said rotatable member corresponding to records of different sizes, and means in said control means for effectively disengaging the cam engaging means of said elongated member from said rotatable member to enable unobstructed swinging movements of said elongated member together with said tone arm structure during playing of a record.

25. In a record changing phonograph having a chassis plate, a power-driven, rotatable turntable having a spindle and a tone arm structure including a tone arm spindle and stylus means, and wherein records which may be of different sizes are supported in a stack on a center spindle which extends above said turntable and has a supporting surface from which records are released one by one from the bottom of the stack by being pushed sidewardly to descend along said spindle to the turntable whereon they are accumulated in a pile, the top side of the latest released record being played by said stylus means by depositing the tone arm to engage said stylus means against said record top side in a start-of-play position dependent upon the size of the record, in combination: a feeler and record ejector abutment mounted on said tone arm, a change cycle controlling cam mounted to rotate through one complete revolution to control performance of the change cycle and having a group of cam tracks for controlling inward and outward swinging of said tone arm, tone arm lifting control means operable for controlling raising and lowering of said tone arm and operable to retain the tone arm in different horizontal planes between the raising and lowering thereof in timed relationship to the swinging movement of the tone arm, means operable to rotate said cam disc, means operable to initiate rotation of said cam disc after playing of a record, means operable to stop rotation of said cam disc after the change cycle, said tone arm structure including a cam follower member arranged to be guided in said group of cam tracks to cause said tone arm to swing inwardly and outwardly, said group of cam tracks including a playing recess in which said cam follower member can swing freely during playing of a record when the tone arm stylus follows sound grooves in the record surface and in operative sequence as the cam disc rotates, a record size feeler control track operatively timed with said tone arm lifting control means to control said tone arm to be swung horizontally inwards in raised position to engage its feeler abutment against the edge of the bottom record of the stack on said center spindle and for thereby interrupting the swinging movement of the tone arm, a track arrangement merging into said playing recess and including a plurality of tracks of varying radii, each of which merges into said playing recess at a radius operable to cause said tone arm to be swung inwards to be landed in its start-of-play position on a record of a predetermined size governed by the radius of each of said tracks at its point of merging into said playing recess, means operable to select the appropriate one of said tracks in response to said engagement of said record edge, each of said tracks of varying radii having an intermediate portion operable to move said track follower and thereby said tone arm inwardly in continuation of the engagement between said feeler abutment and said record edge to thereby cause said record engaged to be pushed sidewardly to be released and to be guided along said center spindle to its playing position on the turntable, said track arrangement being operatively timed with said tone arm lifting control means to cause said tone arm to be lowered so as to engage its stylus with the initial sound groove of said record when the tone arm has been swung to its start-of-play position.

26. In a record changing phonograph having a chassis plate, a power-driven, rotatable turntable having a spindle and a tone arm structure including a tone arm, a tone arm spindle and stylus means, and wherein records which may be of different sizes are supported in a stack on a center spindle which extends above said turntable and has a supporting surface from which records are released one by one from the bottom of the stack by being pushed sidewardly to descend along said spindle to the turntable whereon they are accumulated in a pile, the top side of the latest released record being played by said stylus means of the tone arm by depositing the tone arm to engage its stylus means against said record top side in a start-of-play position dependent upon the size of the record, in combination: a feeler and record ejector arrangement mounted on said tone arm and comprising an ejector abutment, a low friction member for engaging with the surface of a record during outward movement of the tone arm and a high friction member in trailing disposition with respect to said low friction member for engaging said record surface when said low friction member has passed the edge of said record, a change cycle controlling cam disc mounted to rotate one complete revolution for controlling the change cycle and having a group of cam tracks for controlling inward and outward swinging of said tone arm, a tone arm lifting control means operable for controlling raising and lowering of said tone arm and operable to retain the tone arm in different horizontal planes between the raising and lowering thereof in timed relationship to the swinging movement of the tone arm, means operable to rotate said cam disc, means operable to start rotation of said cam disc after playing of a record, means operable to stop rotation of said cam disc after the change cycle, said tone arm structure including a cam follower member arranged to be guided in said group of cam tracks to cause said tone arm to swing inwardly and outwardly, said group of cam tracks including a playing recess in which said cam follower member can swing freely during playing of a record when the tone arm stylus follows sound grooves in the record surface and in operative sequence as the cam disc rotates, a record size feeler control track operatively timed with said tone arm lifting control means to control said tone arm to be swung horizontally in raised position to engage its feeler arrangement against a peripheral portion of the bottom record of the stack on said center spindle for thereby interrupting the swinging movement of the tone arm by engagement of said high friction member with said peripheral portion, a track arrangement merging into said playing recess including a plurality of tracks of varying radii each of which merges into said playing recess at a radius operable to cause said tone arm to be swung to a position in which it can be landed in a start-of-play position on a record of a predetermined size governed by the radius of each of said tracks where it merges into said playing recess, means operable to select the appropriate one of said tracks in response to the frictional restraint on said outward movement of said tone arm, each of said tracks of varying radii having a portion operable to move said tone arm further to bring said ejector abutment thereon into engagement with said record edge and thereafter to move said tone arm inwardly with said ejector abutment engaged against said record edge to push said record sidewardly to be released and to be guided along said center spindle to its playing position on the turntable, said track arrangement being operatively timed with said tone arm lifting control means to cause said tone arm to be lowered so as to engage its stylus means with the initial sound groove of said record when the tone arm has been swung to its start-of-play position.

27. In a record changing phonograph having a center spindle operable to support a stack of records which may be of different sizes, means operable to transfer the records from the bottom of said stack one by one, a turntable operable to support said records in a pile after they have been released from said center spindle, a tone arm structure including a tone arm provided with stylus means operable to play the top side of the exposed record of said pile on said turntable, and a cam disc operable to control in- and outward swinging of said tone arm from an end-of-play position after playing of a record to a start-of-play position for playing the next record, and having means operable to control raising and lowering of said tone arm as well as to retain said tone arm in different raised positions during its swinging movement, the improvement comprising a feeler arrangement disposed on said tone arm including first means operable to allow unobstructed outward travel of the tone arm in engagement with a record surface, and second means operable to impose a restraint on further outward movement of the tone arm in response to engagement against the record surface when said first means has passed beyond the record edge, said tone arm structure further including a cam follower member mounted for being engaged in tracks of said cam disc for controlling swinging of said tone arm as the cam disc rotates, said cam tracks including a feeler track operatively timed with a portion of said means which controls raising and lowering of the tone arm to swing the tone arm outwardly in the raised position thereof with said first feeler means biased against the undersurface of the next record to be played while said record is supported on said center spindle to render said second feeler means operative to restrain outward travel of said tone arm in a position of the edge orbit of said record, a playing recess in which said track follower can swing freely during the playing of a record, track means operable to guide said track follower from said feeler track to said playing recess through a plurality of different paths of varying radii to swing the tone arm to a plurality of start-of-play positions responding to records of different sizes, and means for selecting the appropriate one of said paths for said track follower in response to said restraint against outward tone arm movement caused by said engagement between said second feeler means and said record.

28. In a phonograph apparatus for playing records of differing sizes, a tone arm, means urging said tone arm to move outwardly across the surface of a record to be played and beyond the edge of that record, a feeler arrangement disposed on the tone arm and comprising a first member for engaging the surface of and passing beyond the edge of said record during the outward movement of the tone arm, a friction member disposed on the tone arm engaging the surface of that record upon the first member passing beyond the edge of the record and thereupon imposing a frictional restraint on further outward movement of the tone arm, and means operative responsive to said frictional restraint for controlling depositing the tone arm on the record in a start-of-play position dependent on the diameter of said record determined by the position at which said feeler has been subjected to said restraint during the outward movement of said tone arm.

29. In a record changing phonograph having a chassis plate, a power-driven, rotatable turntable having a spindle and a tone arm structure including a tone arm, a tone arm spindle and stylus means, and wherein records which may be of different sizes are supported in a stack on a center spindle which extends above said turntable and from which records are released one by one from the bottom of the stack to the turntable whereon they are accumulated in a pile, the top side of the latest released record being played by said tone arm stylus means by depositing the tone arm to engage its stylus means against said record top side in a start-of-play position dependent upon the size of the record, in combination: feeler means mounted on said tone arm, a change-cycle control cam disc mounted to rotate through a predetermined angle and having a group of cam tracks for controlling the change cycle when rotated through said angle, tone arm lifting control means operable to control raising and lowering of said tone arm and retaining of said tone arm in different horizontal planes between the raising and lowering thereof in timed relationship to the swinging movement of the tone arm during the change cycle, means operable to rotate said cam disc, means operable to initiate rotation of said cam disc after playing of a record, means operable to stop rotation of said cam disc after the change cycle, said tone arm structure including a cam follower member arranged to be guided in said group of cam track to cause said tone arm to swing inwardly and outwardly, said group of cam tracks including a playing recess in which said cam follower member can swing freely during playing of a record when the tone arm stylus follows sound grooves in the record surface and a record size feeler control track operatively timed with said tone arm control means to cause said tone arm to be swung in raised position to engage its feeler means against a peripheral portion of the bottom record to be played next and of any size in the stack on said center spindle for thereby interrupting the swinging movement of the tone arm, track means operable to guide said cam follower member to said playing recess through a plurality of different paths of varying radii to swing the tone arm to be landed on said record in its start-of-play position, means operable to select the appropriate path of said track arrangement in response to said engagement, and means operable to release said bottom record from the stack to its playing position on the turntable after the selection of said appropriate path.

30. In a record changing phonograph having a turntable in combination: a tone arm structure mounted for swinging movement and including a tone arm and a cam follower arm having a cam follower member operatively connected with said tone arm, a tone arm movement control system comprising an essentially flat cam disc having a plurality of tracks in its surface operable to control inward and outward swinging of said tone arm when said cam follower member is guided in said tracks, a support for a stack of records above and essentially parallel with said turntable, means for releasing the bottom record of said stack to the turntable for being played, lifting control means in timed relationship to the operation of said cam tracks in said cam disc and operable to raise and lower said tone arm and to retain it in different horizontal planes during its swinging movement, a feeler arrangement on said tone arm including an abutment member operable to engage the underside surface of the bottom record of said stack and a member operable to retain said abutment spaced from said record surface until it arrives adjacent the periphery of the record during outward travel of the tone arm so as to then engage a peripheral surface portion of the next record to be played, means operable in response to such engagement to resist further swinging of said tone arm structure, said cam disc having a recess in which said cam follower can swing freely during the playing of the record and being provided, in operative sequence as the cam disc rotates, with a feeler control track timed with said lifting control means and operable to swing the tone arm continuously outwardly in the raised position thereof resiliently biased against said record surface until said tone arm feeler abutment comes into engagement therewith and thereby causes resistance to further swinging of the tone arm structure, and track means operable to guide said cam follower member from said feeling control track to said playing recess through a plurality of different paths of varying radii, each path corresponding to a record of a different size and operable to cause the tone arm to be moved to a start-of-play position on a record of the size in question, yielding means actuable in response to the resistance against said outward swinging of said tone arm structure when said tone arm feeler engages said record during the passage of said cam follower in said feeler track, the actuation of said yielding means being operable to select the appropriate one of said paths of said cam follower member corresponding to the size of the record which has been engaged by said feeler abutment.

31. In a record changing phonograph having a turntable in combination: a tone arm structure mounted for swinging movement and including a tone arm and a cam follower arm having a cam follower member operatively connected with said tone arm, a tone arm movement control system comprising an essentially flat cam disc having a plurality of tracks in its surface operable to control inward and outward swinging of said tone arm when said cam follower member is guided in said tracks, a support for a stack of records above and essentially parallel with said turntable, means for releasing the bottom record of said stack to the turntable for being played, lifting control means in timed relationship to the operation of said cam tracks in said cam disc and operable to raise and lower said tone arm and to retain it in different horizontal planes during its swinging movement, a feeler member on said tone arm operable to engage a peripheral portion of the next record to be played and operable in response to such engagement to resist further swinging of said tone arm structure, said cam disc having a recess in which said cam follower can swing freely during the playing of the record and including further, in its operative sequence as the cam disc rotates, a feeler control track timed with said lifting control means and operable to swing the tone arm continuously in one direction in the raised position thereof until said tone arm feeler comes into engagement with the peripheral portion of the lowest record on said support and thereby causes resistance to further swinging of the tone arm, and track means operable to guide said cam follower member from said feeling control track to said playing recess through a plurality of different paths of varying radii, each path corresponding to a record of a different size and operable to cause the tone arm to be moved to a start-of-play position on a record of the size in question, yielding means actuatable in response to the resistance against swinging of said tone arm structure when said tone arm feeler engages said record during the passage of said cam follower in said feeler track, the actuation of said yielding means being operable to select the appropriate one of said paths of said cam follower member corresponding to the size of the record which has been engaged by said feeler abutment.

32. In a record changing phonograph having a tone arm including a feeler member operable to engage a peripheral portion of the next record to be played and operable by said engagement to discontinue swinging movement of said tone arm feeling the size of said record, and means thereafter causing said tone arm to be moved to a start-of-play position governed by the size of said record, the combination comprising a tone arm movement control system comprising an essentially flat cam disc having a plurality of tracks in its surface and a cam follower arm having a cam follower member operatively connected with said tone arm for swinging therewith and for controlling the inward and outward swinging movements of said tone arm when said cam follower member is guided in said tracks in the surface of said cam disc, said tracks including a recess in which said cam follower can swing freely during the playing of the record and, in the operative sequence as the cam disc rotates, a swinging control track operable to swing the tone arm continuously in one direction and track means operable to guide said cam follower member from said swinging control track further to said playing recess through a plurality of different paths of varying radii, each path corresponding to a record of a different size, said track means merging into said playing recess for controlling landing of said tone arm in the appropriate start-of-play position thereof on the record engaged by said feeler abutment, and a resilient structure operable in response to the discontinuation of the swinging movement of said cam follower in said feeler track as caused by the engagement of said tone arm feeler member against said record to select the appropriate one of said paths in said track means of said cam follower member corresponding to the size of the record.

33. In and for a record changing phonograph having a tone arm and including a feeler member operable to position the tone arm at a point of its travel for feeling the size of the next record to be played, whereafter the tone arm is caused to be moved to a start-of-play position governed by the size of said record, a tone arm movement control system comprising: a rotatably arranged flat cam disc having a plurality of tracks in its surface and a cam follower arm having a cam follower member operatively connected with said tone arm for being positioned with said tone arm in response to the operation of said feeler member and operable to control inward and outward swinging of said tone arm when said cam follower member is guided in said tracks in the surface of said cam disc, said tracks including a recess in which said cam follower can swing freely during the playing of the record and, in the operative sequence as the cam disc rotates, a feeler control track operable to swing the tone arm continuously in one direction and track means operable to guide said cam follower member from said swinging control track further to said playing recess through a plurality of different paths of varying radii, said track means merging into said playing recess for controlling landing of said tone arm in the appropriate start-of-play position thereof on the record corresponding to the size thereof, and resilient means operable to select the appropriate one of said paths of said cam follower member in response to the position of said track follower as caused by the operation of said feeler when positioning said tone arm so as to land said tone arm in its start-of-play position corresponding to the size of the record after it has been engaged by said feeler abutment.

34. In a record changing phonograph having a power-driven turntable, a tone arm structure mounted for swinging and including a tone arm having a stylus, a cam follower arm having a cam follower member swinging freely with the tone arm during playing of a record and operable to control swinging of the tone arm guided by portions of a rotatable cam member during the change cycle, and tone arm lifting control means operable to raise and lower said tone arm and retain it in different heights, and wherein records, which may be of different sizes, are supported horizontally in a stack vertically spaced from said turntable and are released one by one from the bottom of said stack to the turntable on which the top side of the latest released record is played by means of the tone arm stylus, and in which further a feeler abutment is operable to gauge the size of the next record to be played, and a cycle control mechanism for moving the tone arm is operable in response to said gauging of the record size to control movement of the tone arm to a start-of-play position dependent upon the size of the record, the improvement consisting in said feeler abutment being mounted on said tone arm, the control system for swinging the tone arm comprising a cam member having a feeler movement control portion in timed relationship with a portion of said lifting control means which retains the tone arm in a raised position in which said abutment on said tone arm is in a position for engagement with the edge of the lowermost of said records supported on said support, said feeler cam portion being operable to guide the cam follower inwardly to swing said tone arm structure to engage said feeler abutment against said record edge whereby further inward swinging of the tone arm is interrupted, said cam member further including cam means operable to guide said cam follower from said feeler cam portion to said position in which said tone arm structure can swing freely during the playing of a record through a plurality of different paths causing varying radial movements of said tone arm stylus relatively to the edge of a record, each path corresponding to a record of a different size and being operable to cause the tone arm to be moved to a start-of-play position in which the tone arm stylus is deposited on a record of the size in question, and said control system further including a yielding structure operable to be actuated in response to the interruption of the swinging movement of the tone arm structure when the tone arm feeler abutment engages said record edge and the cam follower is guided by said feeler cam portion, the actuation of said yielding structure being operable to select the appropriate one of said paths of the cam follower member corresponding to the size of that record the edge of which has been engaged by the feeler abutment.

35. In a record changing phonograph having a power-driven turntable and a tone arm structure mounted for swinging and included with a tone arm having a stylus, a cam follower arm having a cam follower member swinging freely with the tone arm during playing of a record and operable to control swinging of the tone arm guided by portions of a rotatable cam member during the change cycle and tone arm lifting control means operable to raise and lower said tone arm and retain it in different heights, and wherein records, which may be of different sizes, are supported horizontally in a stack vertically spaced from said turntable and are released one by one from the bottom of said stack to the turntable on which the top side of the latest released record is played by means of the tone arm stylus, and in which further a feeler arrangement is operable to gauge the size of the next record to be played, and a cycle control mechanism for moving the tone arm is operable in response to said gauging to control movement of the tone arm to a start-of-play position dependent upon the size of the record, the improvement that said feeler arrangement is mounted on said tone arm and has a feeler member operable to engage a peripheral portion of the next record to be played to thereby cause resistance to further swinging of the tone arm, that said control system for swinging the tone arm comprises a cam member having a feeler control portion related in time with a portion of said lifting control means which retains the tone arm in a raised position prepared for engagement between said feeler member and said peripheral portion of the lowermost of said records supported on said support, said feeler cam portion being operable to guide the cam follower to swing said tone arm structure to bring said tone arm member to engage said peripheral portion whereby resistance to further swinging of the tone arm is caused, and that said cam member further includes cam means operable to guide said cam follower from said feeler cam portion to the position in which said tone arm structure can swing freely during the playing of a record through a plurality of different paths, each path corresponding to the swinging movement of the tone arm corresponding to a record of a different size and each path being operable to cause the tone arm to be moved to its start-of-play position when the tone arm stylus is deposited on a record of the size in question, and that said control system further comprises yielding means operable to be actuated in response to the resistance against swinging movement of the tone arm structure when the tone arm feeler member engages said record edge, the actuation of said yielding means being operable to select the appropriate one of said paths of the cam follower member corresponding to the size of that record the edge of which has been engaged by the feeler abutment.

36. A record changing phonograph in which the size of the next record to be played is gauged by means of an abutment on the tone arm, comprising a turntable for supporting thereon the record to be played, a stationary spindle projecting upwardly from said turntable for centering the record to be played with respect to said turntable and including means for supporting thereon at least one other record to be played subsequent to said first-mentioned record, a tone arm with abutment means, means for mounting said tone arm to swing about a relatively fixed axis, means including cam follower means operatively connected with said tone arm for swinging in unison therewith about said relatively fixed axis, and a cam member having first cam means for engaging said follower means to move said tone arm against the record to be played next and thereby gauge the size thereof by said abutment means while said next record is supported by the said first-mentioned supporting means on said spindle in spaced relationship with said turntable, and second cam means operable to engage said follower means and responsive to said gauging operation for eventually swinging said tone arm to the starting position with respect to said spindle.

37. A record-changing phonograph in which the size of the next record to be played is gauged by means of an abutment on the tone arm, comprising a turntable for supporting thereon the record to be played, a stationary spindle projecting upwardly from said turntable for centering the record to be played with respect to said turntable and including means for supporting thereon at least one record to be played in spaced relationship to said turntable, a tone arm, and control means including cam follower means operatively connected with said tone arm and mounted for swinging movement in unison with said tone arm about a common axis, a cam member having first means operable to engage said cam follower means to swing said tone arm for moving the same against the record to be played next to gauge the size thereof by said abutment means while said next record is supported by said first-mentioned means on said spindle in spaced relationship with said turntable, said cam member having second cam means operable to enage said cam follower means for subsequently swinging said tone arm to the start-of-play position thereof corresponding to the size of the record as gauged by the engagement of said abutment means with the next record to be played.

38. A record changing phonograph for playing a plurality of records of different sizes comprising in combination: a tone arm structure including a tone arm spindle having a pivot axis, a track follower, and means operatively connecting said track follower with said tone arm spindle to swing in unison with said tone arm about said pivot axis, a turntable for supporting records during the playing thereof, stationary spindle means having supporting means for supporting a stack of records above said turntable, release means adapted to release any records in sequence from said supporting means to said turntable, abutment means on said tone arm, and a control cycle mechanism including a plurality of cam means, first means operable to actuate said release means in response to rotation of a first one of said cam means, second means operable to raise and lower said tone arm in response to rotation of a second one of said cam means, and third means including said track follower and operable in response to rotation of a third one of said cam means to swing said tone arm about said axis through a control cycle to thereby engage said abutment means with the peripheral portion of the next record to be released while said record is supported on said spindle means and to thereby effectively determine the correct start-of-play position for said tone arm corresponding to the size of the next record to be played.

39. A record changing phonograph for playing a plurality of records of different sizes comprising in combination: a tone arm structure including a tone arm spindle having a pivot axis, a track follower, and means operatively connecting said track follower with said tone arm spindle to swing in unison therewith about said pivot axis, a turntable for supporting records during the playing thereof, stationary spindle means having supporting means for supporting a stack of records above said turntable, release means adapted to release any records in sequence from said supporting means to said turntable, abutment means on said tone arm, and a control cycle mechanism including a plurality of cam means, first means operable to actuate said release means in response to rotation of a first one of said cam means, second means operable to raise and lower said tone arm in response to rotation of a second one of said cam means, and third means including said track follower and operable in response to rotation of a third one of said cam means to swing said tone arm about said axis through a control cycle to thereby engage said abutment means with the peripheral portion of the next record to be released while said record is supported on said spindle means and to thereby effectively determine the correct start-of-play position for said tone arm corresponding to the size of the next record to be played, one of said third means and said third cam means being provided with means for effectively disengaging said track follower from the control effect of said third cam means during playing of a record.

40. A record changing phonograph for playing a plurality of records of different sizes comprising in combination: a tone arm, a turntable for supporting records during the playing thereof, stationary spindle means having supporting means for supporting a stack of records above said turntable, means for releasing said records in sequence from said supporting means to said turntable, abutment means on said tone arm, a cycle control mechanism including first means operable to actuate said release means, second means operable to raise and lower said tone arm, and third means including a cam disk provided with a recess and with track means and an arm operatively connected with said tone arm and having track follower means operable to engage said track means and said recess of said cam disk, said track means being operable to swing said tone arm thereby effectively providing paths of differing radii for said track follower means leading to said recess, said recess being effectively operable to disengage said cam disk from said track follower means, said first, second and third means being operable in timed relationship to first engage said abutment means on said tone arm with the periphery of the next record to be released while said record is supported on said spindle means and to thereby selectively move said track follower means guided by said track means so as to be effectively landed in said recess in the start-of-play position thereof in response to the size of the record engaged, secondly to release said record after said engagement and eventually to lower the tone arm on said record in said start-of-play position after said record has been released and descended to the turntable.

41. In a record changing phonograph for playing a plurality of records of different sizes having a tone arm, a turntable for supporting records during the playing thereof, stationary spindle means having supporting means for supporting a stack of records above said turntable and means for releasing said records in sequence from said supporting means to said turntable, the improvement essentially consisting of a cycle control mechanism comprising control means operable to selectively move said tone arm in the horizontal and vertical directions including a cam disk provided with a recess and with track means and track follower means operatively connected with said tone arm and operable to engage said track means and said recess of said cam disk, said track means being operable to swing said tone arm thereby effectively providing a plurality of different paths for said track follower means leading to said recess at different radial distances to said spindle means, said recess being operable to effectively disengage said cam disk from said track follower means, and said control means being operable in timed relationship to first engage said tone arm with the periphery of the next record to be released while said record is supported on said spindle means and to thereby selectively move said track follower means guided by said track means so as to be effectively landed in said recess in the correct start-of-play position thereof in response to the size of the record engaged and eventually to lower the tone arm on said record in said start-of-play position after the next record to be played has been released from said supporting means to the turntable.

42. In a record changing phonograph for playing a plurality of records of different sizes having a tone arm, a turntable for supporting records during the playing thereof, stationary spindle means having supporting means for supporting a stack of records above said turntable and means for releasing the records in sequence from said supporting means to said turntable, the improvement essentially consisting of a cycle control mechanism comprising control means operable to selectively move said tone arm in the horizontal and vertical directions and including a cam disk provided with a recess and with track means and track follower means operatively connected with said tone arm and operable to engage said track means and said recess of said cam disk, said track means being operable to swing said tone arm thereby effectively providing a plurality of different paths for said track follower means leading to different start-of-play positions thereof in said recess, means including only said recess for effectively disengaging said cam disk from said track follower means during playing of a record, said control means being operable to first engage said tone arm with the periphery of the next record to be released while said record is supported on said spindle means and to thereby select for said track follower means the track means which effectively lands said track follower means in said recess in the correct start-of-play position thereof in response to the size of the record engaged by said tone arm, secondly to release said record after said engagement and eventually to lower the tone arm on said record in said star-of-play position after said record has been released and descended to the turntable.

References Cited in the file of this patent

UNITED STATES PATENTS 2,818,263    Dale _____ Dec. 31, 1957

FOREIGN PATENTS 554,282    Great Britain _____ June 28, 1943
110,392    Sweden _____ Apr. 18, 1944